United States Patent
Kundermann

(10) Patent No.: US 6,343,527 B2
(45) Date of Patent: Feb. 5, 2002

(54) COUPLING DEVICE WITH AN ACCOMMODATING FIXTURE FOR A DRIVING GEAR ON A CENTRIFUGAL MASS

(75) Inventor: Wolfgang Kundermann, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/246,463

(22) Filed: Feb. 9, 1999

(30) Foreign Application Priority Data

| Feb. 9, 1998 | (DE) | ................................. | 198 04 866 |
| Mar. 25, 1998 | (DE) | ................................. | 198 13 056 |
| Oct. 20, 1998 | (DE) | ................................. | 198 48 252 |

(51) Int. Cl.[7] ............................................. G05G 1/00
(52) U.S. Cl. ........................... 74/572; 74/574; 475/347; 464/68
(58) Field of Search .................... 74/572–574; 475/347; 464/68; 192/3.52

(56) References Cited

U.S. PATENT DOCUMENTS

| 4,406,641 A | | 9/1983 | Mallet | |
| 5,570,615 A | * | 11/1996 | Westphal et al. | .............. 74/574 |
| 5,816,973 A | * | 10/1998 | Sudau et al. | ................ 475/347 |
| 5,836,216 A | * | 11/1998 | Sudau et al. | ................. 464/68 |
| 5,845,384 A | | 12/1998 | Retzbach | |
| 5,863,274 A | * | 1/1999 | Jackel | ......................... 475/347 |
| 5,927,452 A | * | 7/1999 | Freise et al. | ................ 192/3.52 |
| 6,058,802 A | * | 5/2000 | Sudau et al. | .............. 74/573 F |

FOREIGN PATENT DOCUMENTS

| DE | 32 22 119 | | 10/1983 | |
| DE | 41 22 135 | | 1/1993 | |
| DE | 94 14 314 | * | 1/1995 | ................ 74/572 |
| DE | 44 22 732 | | 6/1995 | |
| EP | 200 529 | | 11/1986 | |
| EP | 0 220 986 | | 5/1987 | |
| EP | 631 062 | | 12/1994 | |
| GB | 802777 | | 10/1958 | |
| GB | 929877 | | 6/1963 | |
| GB | 1 588 407 | | 4/1981 | |
| GB | 2 171 447 A | | 8/1986 | |
| WO | WO 92/12355 | | 7/1992 | |

* cited by examiner

Primary Examiner—Vinh T. Luong
(74) Attorney, Agent, or Firm—Cohen, Pontani, Lieberman & Pavane

(57) ABSTRACT

A coupling device having a drive-side centrifugal mass, which is actively connected in rotation-proof fashion to a driving gear that acts on the drive train. On the centrifugal mass, there is an accommodating fixture that faces the driving gear and is equipped with a tooth system. The driving gear has an axial shoulder that, on its end facing the accommodating fixture, is also embodied with a tooth system. At least one tooth of the tooth system of the driving gear is pressed, under radial prestress, into the space between two teeth of the tooth system of the accommodating fixture.

40 Claims, 23 Drawing Sheets

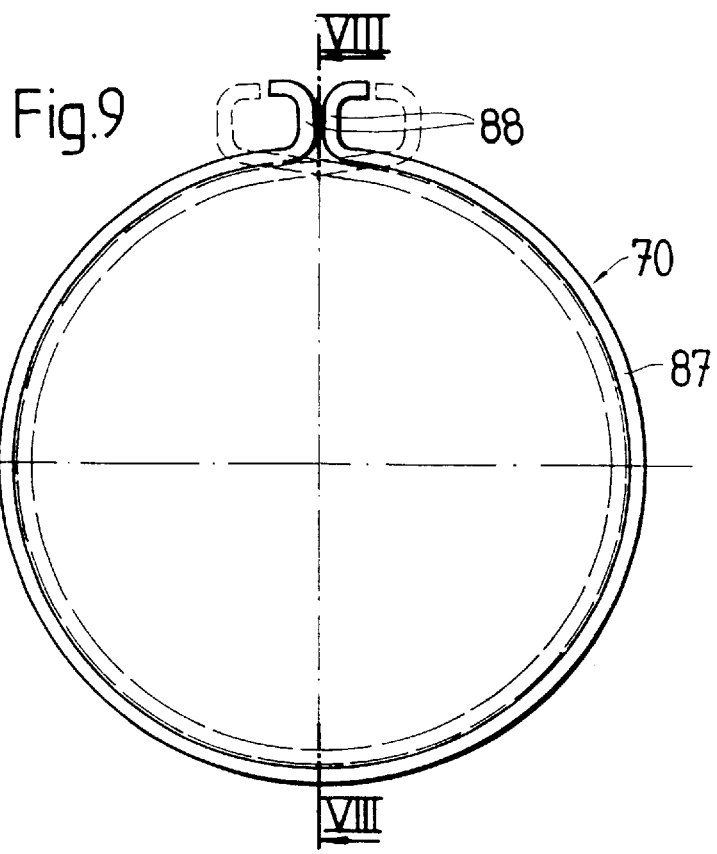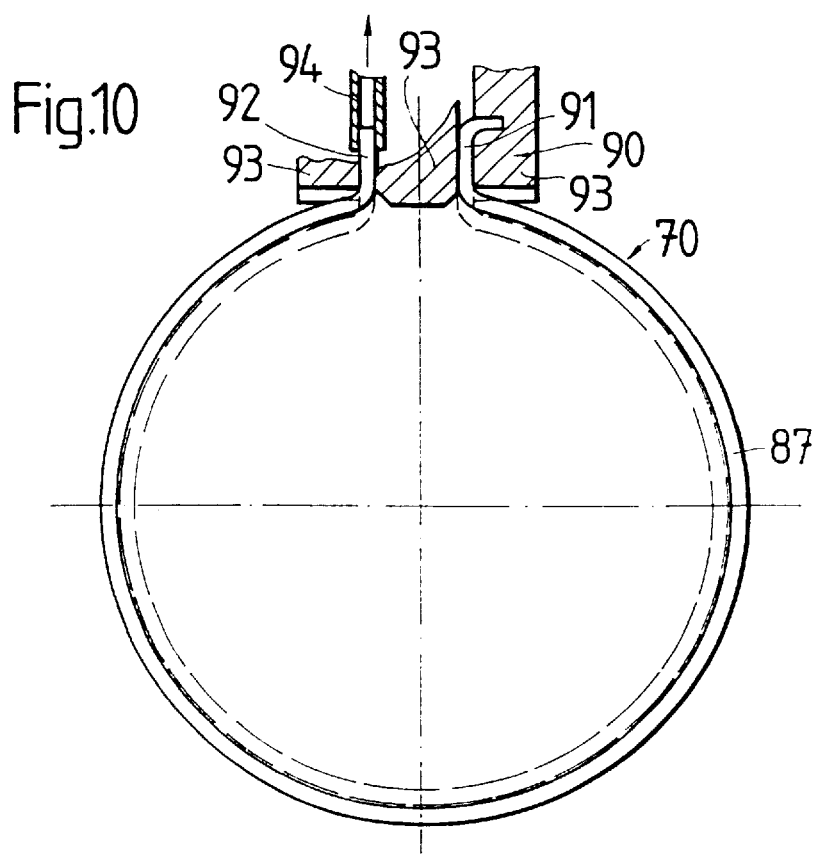

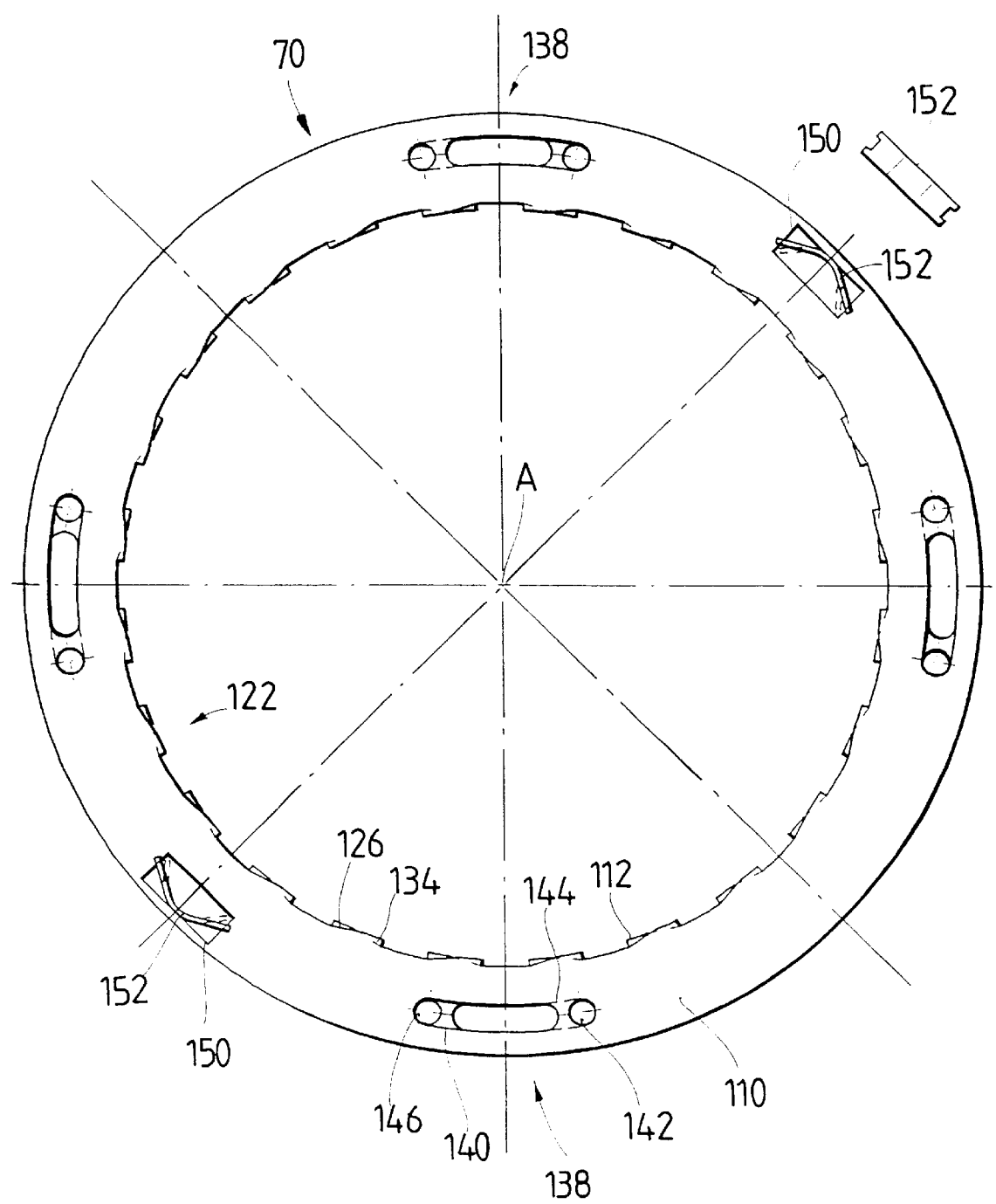

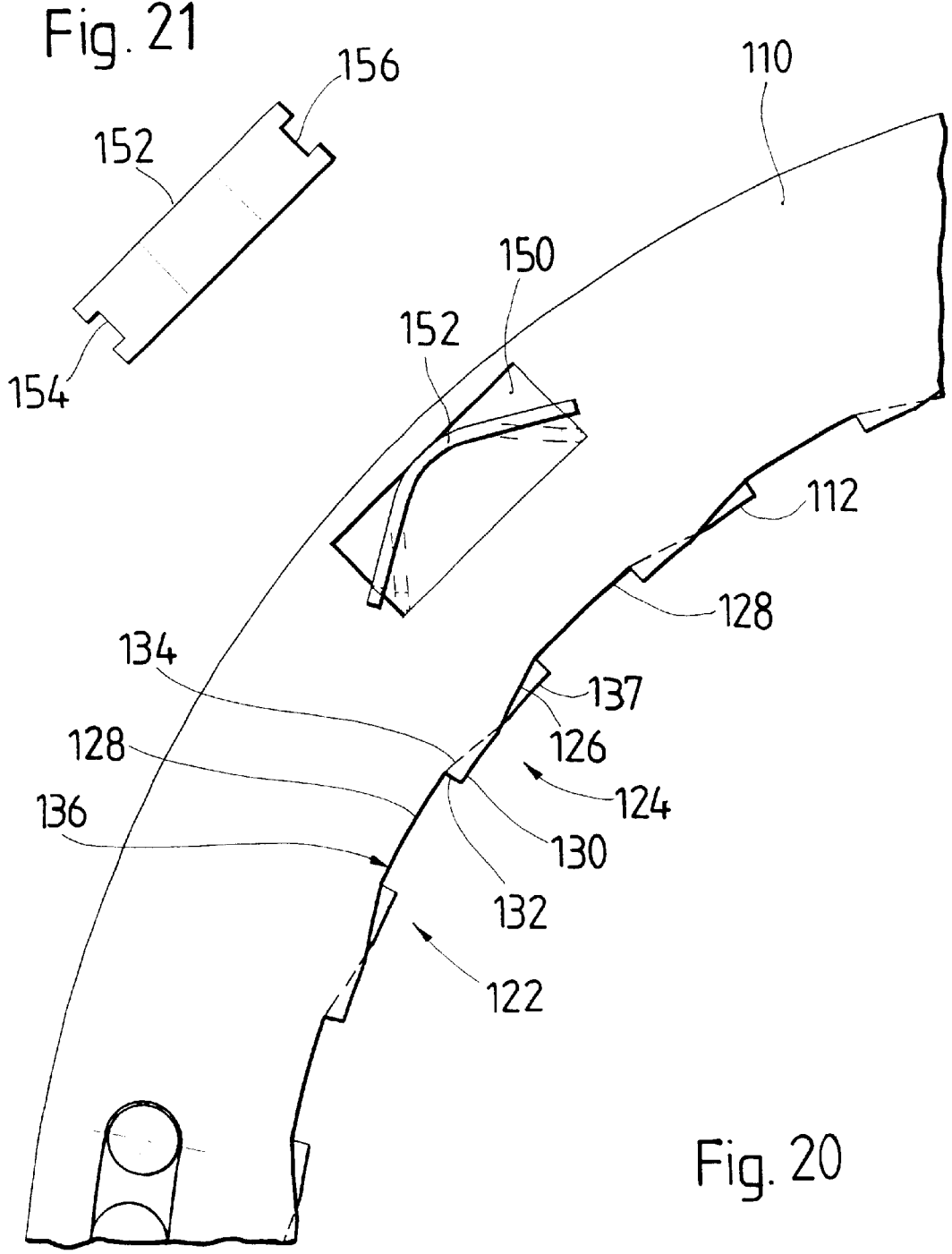

COUPLING DEVICE WITH AN ACCOMMODATING FIXTURE FOR A DRIVING GEAR ON A CENTRIFUGAL MASS

BACKGROUND OF THE INVENTION

1. Field of the Invention

The invention relates to a coupling device with a centrifugal mass facing a drive train.

2. Discussion of the Prior Art

German reference DE 41 22 135 A1 describes (e.g., in FIG. 1) a coupling device in the form of a hydrodynamic torque converter, in which a centrifugal mass that faces the drive train consists of a radial flange. The radial flange runs radially outward from a bearing journal mounted via a holding means in the gear housing and is securely connected to the pump shell of the pump wheel. On the other hand, the turbine wheel forms, with an output shaft, an output-side centrifugal mass.

The radially inner bearing journal is embodied with an internal tooth system, which engages into an external tooth system on a drive shaft. The drive shaft also has an external tooth system at its other end, via which it engages into a corresponding internal tooth system on the crank shaft of an internal combustion engine. The drive shaft thus serves as a driving gear for the centrifugal mass facing the drive train.

Although a rotation-proof connection between the drive train and the centrifugal mass is thus established by the drive shaft, it is unavoidable, due to play in the tooth systems, that when torsional vibrations occur, there is rattling in the area of these tooth systems.

It is also problematic in this known coupling device that neither the holding means for the bearing journal nor the drive shaft ensures the axial attachment of the centrifugal mass that faces the drive train—and thus of the entire torque converter—to the crank shaft. As a result, the torque converter can carry out axial movements, which must be supported in the gearbox and could lead to damage there.

To avoid these problems, a plate that is elastic in the axial direction is usually screwed to the free end of the crank shaft of the drive train, as shown in FIG. 1 of German reference DE 32 22 119 C1. The plate, in the radially outer area, is also screwed to the drive-side centrifugal mass of the coupling device, which, in this case, is again a hydrodynamic torque converter. However, this solution is expensive, because the screw connection of the flexible plate to the centrifugal mass requires that threaded blocks, which serve to hold the screws, be distributed around and attached to the circumference at a certain distance from each other. Moreover, a screw connection of the flexible plate to the centrifugal mass of the coupling device is highly problematic due to cramped space conditions and difficult access.

SUMMARY OF THE INVENTION

The object of the present invention is to provide a coupling device that can be attached to a drive train without play in the circumferential direction, and that has the least possible assembly expense.

Pursuant to this object, and others which will become apparent hereafter, one aspect of the present invention resides in a coupling device which has a driving gear that acts on a drive train and has a centrifugal mass facing the drive train which is in rotation-proof active connection with the driving gear. In accommodating fixture is provided on the centrifugal mass so as to face the driving gear. The accommodating fixture having a first toothed system. The driving gear has an axial shoulder embodied with a second tooth system on a side facing the accommodating fixture so that at least one tooth of the second tooth system engages into a space between two teeth of the first tooth system whereby the teeth of at least one of the two toothed systems are under radial prestress relative to the other toothed system.

Because the driving gear, which is attached to the drive train, e.g., the crank shaft, of an internal combustion engine, has an axial shoulder, on which is embodied at least one tooth of a tooth system that engages into a corresponding tooth system on an accommodating fixture attached to the centrifugal mass, a rotation-proof connection can be established between the accommodating fixture and the driving gear, and thus between the drive train and the centrifugal mass. Since at least one of the two tooth systems is under radial prestress relative to the other tooth system, the connection between the driving gear and the accommodating fixture is substantially without radial play. For example, when there is radial prestress of the tooth or teeth embodied on the axial shoulder of the driving gear, these teeth are pressed as deeply as possible into the tooth system of the accommodating fixture, so that a force-locking connection to the tooth system of the accommodating fixture is established. This works especially well when the tooth faces of both tooth systems are embodied with wedge-like surfaces, so that a tooth of the driving gear tooth system penetrates radially between two teeth of the tooth system of the accommodating fixture, for example, and is clamped at a predetermined penetration depth. When connected to each other in this fashion, the tooth systems of the driving gear and the accommodating fixture have no play between them, so that even during strong torsional vibrations no rattling can occur. In addition, due to the aforementioned clamping of the teeth of the driving gear in the tooth system of the accommodating fixture, an advantage results during the transmission of torque, namely, due to the torque, a circumferential force acts on the teeth. Because the teeth are engaged with each other without play, each tooth is supported in the circumferential direction, so that the tooth base is not loaded with a bending moment. Instead, each tooth needs only to be supported against transverse forces, so that the load remains limited. This advantage is especially important when the teeth of the driving gear tooth system are supportable by the teeth of an accommodating fixture that is embodied as a ring, for example, and thus has a tooth system whose form is stable in the circumferential direction. The advantage is especially great when the ring-shaped accommodating fixture surrounds the driving gear and is equipped with an internal tooth system, so that the radial prestress of the tooth system of the driving gear, upon rotation, is supplemented by centrifugal force, while the ring surrounding the tooth base of the tooth system on the accommodating fixture radially supports the teeth of the tooth system on the driving gear.

According to another embodiment of the invention, the driving gear tooth system has an axial protection means embodied, for example, as a claw with a radial holding device that engages into a radial depression on the accommodating fixture. When the radial holding device is embodied in wedge-like fashion, a clamping connection is again established with the matching radial depression in the accommodating fixture.

As noted above, the driving gear tooth system is radially prestressed relative to the accommodating fixture. To establish an engaged connection between the driving gear and the accommodating fixture when the accommodating fixture is moved onto the driving gear, an assembly mechanism is used. The assembly mechanism acts on the driving gear so that the axial shoulder of the driving gear is deformed against the prestress effect, so that the engaged connection between the driving gear and the accommodating fixture is established substantially without axial force. As soon as this connection is established, the activity of the assembly mechanism is terminated. This can be done either by removing the assembly mechanism completely from the driving gear or, if the assembly mechanism is to remain on the driving gear, by detaching the assembly mechanism so that it can no longer exert any influence on the driving gear tooth system.

Because the axial shoulder on an axially free end of the driving gear serves as the support surface for the assembly mechanism, the assembly mechanism needs to apply only a relatively small assembly force in the radial direction. This is due to the lever effect of the axially free end relative to the other end, which is attached to the radial flange of the driving gear. The assembly force can thereby be smaller than the prestress force that acts in the direction of the tooth system of the accommodating fixture. This advantageous ratio of assembly force to prestress force allows such a high prestress force to be selected that the friction force in the tooth system alone suffices to block axial movement between the driving gear and the accommodating fixture. As a result, no additional axial securing means is needed.

However, if an axial securing means for the connection between the driving gear and the accommodating fixture is attached to the aforementioned free end of the axial shoulder, this axial securing means can engage into the accommodating fixture in the axial extension area of the tooth system. This results in a very low axial space requirement.

According to a further embodiment, the radial flange of the driving gear can be embodied with an axially elastic flange. The axial elasticity can be increased by embodying the latter flange with an elastic spring coil, so that wobbling movements of the crank shaft can be better compensated for. Advantageously, such an elastic spring coil on the flange is even more effective when equipped with a damping means, consisting preferably of an elastomer, which fills, at least partially, the radial empty space created by the spring coil. A damping means of this type can damp vibrations on the spring coils triggered by the aforementioned tumbling movements of the crank shaft.

Following the example of the driving gear, the accommodating fixture can also be embodied with an axially elastic flange. This measure can introduce additional axial elasticity into the connection between the converter housing and the crank shaft, especially when the axially elastic flange of the accommodating fixture has an elastic spring coil. In addition, when the axial shoulder of the accommodating fixture is embodied at its free end with a receiving surface for an assembly mechanism, a high radial prestress force can be attained between the tooth systems of the driving gear and the accommodating fixture at tolerable assembly forces. As explained above, a rattle-free connection can thus be attained between the tooth systems and, at the same time, additional axial securing means can be dispensed with.

To obtain the coupling strength required in coupling arrangements of this type, the interengaged and reciprocally prestressed tooth systems must rest on each other with relatively great radial prestress and/or the components used must be suitably rigid. However, this means that, to establish or detach the coupled state, relatively great radial force must be exercised on at least one of the tooth systems. The present invention therefore proposes, according to a further embodiment, an assembly mechanism that is able to produce the radial forces required in such couplings. In particular, the invention proposes an assembly mechanism that can establish or detach a toothed engagement between the tooth systems of two components, which tooth systems engage with each other at least radially, and wherein the radially inner tooth system is prestressed radially outward toward the radially outer tooth system, while the component with the radially inner tooth system is radially deformable elastically at least in the area of its tooth system. The assembly mechanism comprises at least one ring element, which is or can be rotatably attached to the component that has the radially inner tooth system. The ring element(s) has a deformation formation via which, upon rotation of the ring element around a rotational axis, the radial position of the component with the radially inner tooth system can be changed in the area of the radially inner tooth system.

This assembly mechanism is preferably constructed so that the deformation formation has, associated with each tooth or group of teeth of the radially inner tooth system, a deformation bevel that extends in the circumferential direction. This deformation bevel is directed radially inward and has, in the circumferential direction, a varying distance to the rotational axis. The deformation bevel allows a rotational movement to be simply converted into a radial movement; specifically, the conversion ratio, and thus the rotary force to be expended, can be determined by the inclination angle of the deformation bevel or bevels.

For example, it is possible for an area of minimum distance between the deformation bevel and the rotational axis and/or an area of maximum distance between the deformation bevel and the rotational axis to be followed in the circumferential direction by an area with approximately constant spacing from the rotational axis. Approximately constant spacing can also load a short area extending substantially tangentially to a radial line.

Preferably, the assembly mechanism according to the invention has two ring elements.

These two ring elements encompass deformation bevels running in opposite directions. Each tooth or group of teeth has associated with it a bevel pair, consisting of a deformation bevel from each ring element.

With such an assembly mechanism, the procedure for establishing or detaching the coupling engagement can be one in which the two ring elements are rotated or rotatable around the rotational axis in opposite directions.

It is thereby advantageous for the two ring elements to be prestressed relative to each other for rotation in the circumferential direction, preferably into a relative rotational position in which the coupling engagement is established between the tooth systems.

To establish or detach the coupled state by means of the assembly mechanism according to the invention, in another embodiment ring element(s) have a tool activity formation to be acted upon by a tool, via which the ring element can be rotated around the rotational axis.

To ensure that the assembly mechanism according to the invention is constructed very simply, i.e., economically and with low total weight, the ring element(s) are held rotatably on the component that has the radially inner tooth system. That is, the ring element is to remain permanently on this particular component, even when the coupled state is established.

The present invention also relates to a coupling device for establishing a rotary coupling between two component groups rotatable around a rotational axis. The coupling device comprises a first element with a first tooth system, associated with one of the component groups, and a second element with a second tooth system, associated with the other component group. The two tooth systems engage radially with each other and are prestressed radially into engagement. Such a coupling device can advantageously be equipped with an assembly mechanism as discussed above.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 9 shows the clamping loop from FIG. 8 as a detail;

FIG. 10 is a view as in FIG. 9, but in a different embodiment;

FIG. 19 is a view corresponding to FIG. 18, but also showing the prestress elements;

FIG. 20 is an enlarged section from FIG. 19;

FIG. 21 is a top view of a prestress spring;

DETAILED DESCRIPTION OF THE PREFERRED EMBODIMENTS

Figure 1:
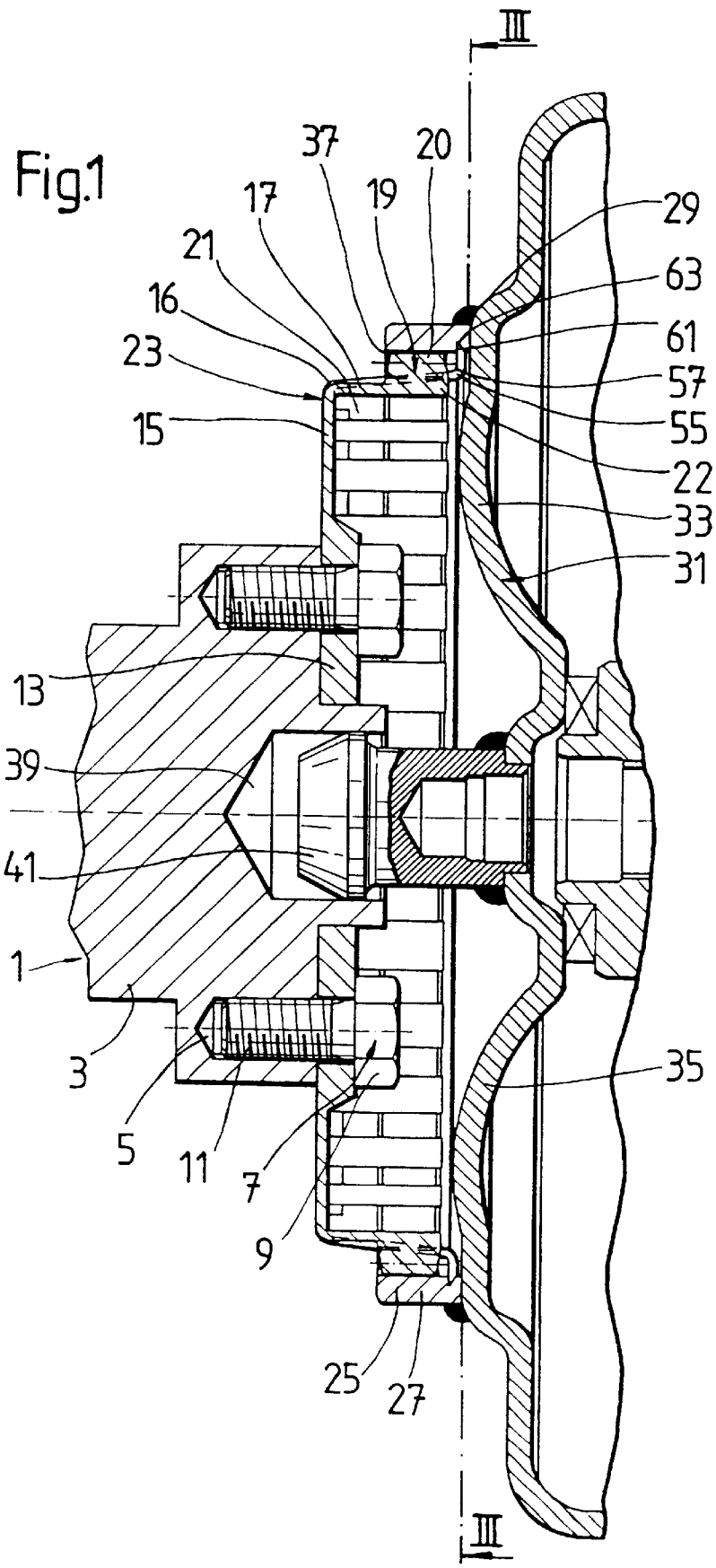
FIG. 1 is a sectional view of a drive train with a driving gear, placed into an accommodating fixture of a coupling device.

FIG. 1 shows the free end of the crank shaft 3 of an internal combustion engine, which acts as the drive train 1. The crank shaft 3 has, distributed around its circumference, a plurality of threaded bores 5, into each of which an attachment means 7 in the form of a screw 9 engages by means of a threaded shaft 11. The attachment means 7 serves to attach a radial flange 13 to the crank shaft 3, which, in the radial area outside of the attachment means 7, undergoes a diminution in cross-section, and thus obtains a flange 15 that is axially elastic. The flange 15 passes via a bend 16 into an axial shoulder 17, which, on its free end 22 that faces away from the crank shaft 3, has a tooth system (second toothed system) 19 with teeth 20 that extend substantially in the axial direction. The teeth 20, before reaching the bend 16, pass axially into a tooth base 21 embodied on the circumference. The radial flange 13 and the axially elastic flange 15 with the axial shoulder 17 form a driving gear 23, which engages with an accommodating fixture 25 in a manner described in greater detail below. The accommodating fixture 25 is embodied as a ring 27 and is attached by means of a weld seam 29 to a centrifugal mass 31 that has a primary flange 33. In the present example, this primary flange 33 is part of a housing 35 of a hydrodynamic torque converter that serves as the coupling device. However, it could also be the drive-side centrifugal mass of a dual-mass flywheel, as indicated, for example, in German reference DE 44 22 732 A1. To accommodate the housing 35 of the hydrodynamic torque converter, the crank shaft 3 has, in its rotational center, an axial bore 39, which holds a bearing journal 41 secured on the radial inside to the primary flange 33.

Figure 2:
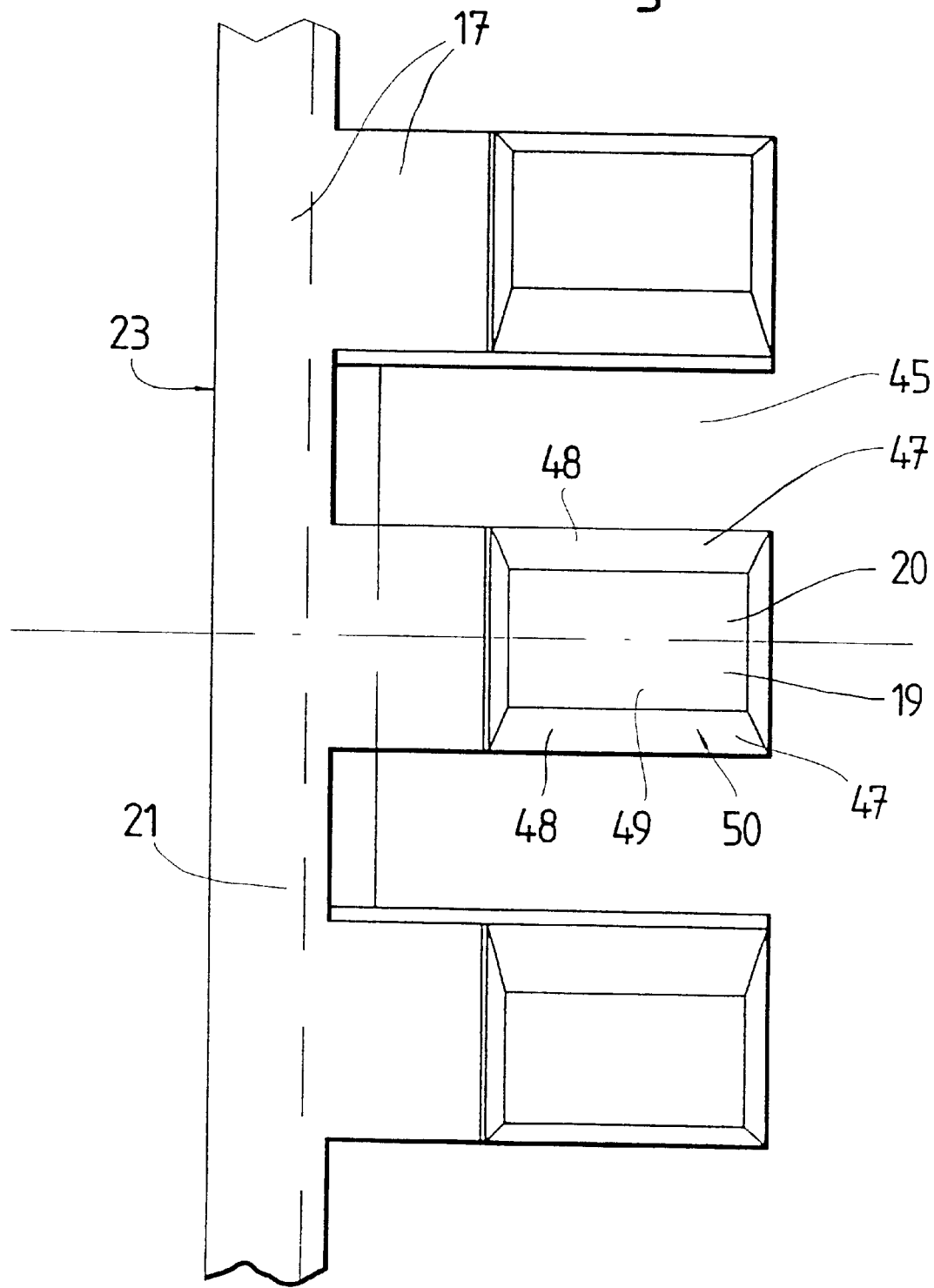
FIG. 2 shows a detail of part of the tooth system of the driving gear.
Figure 3:
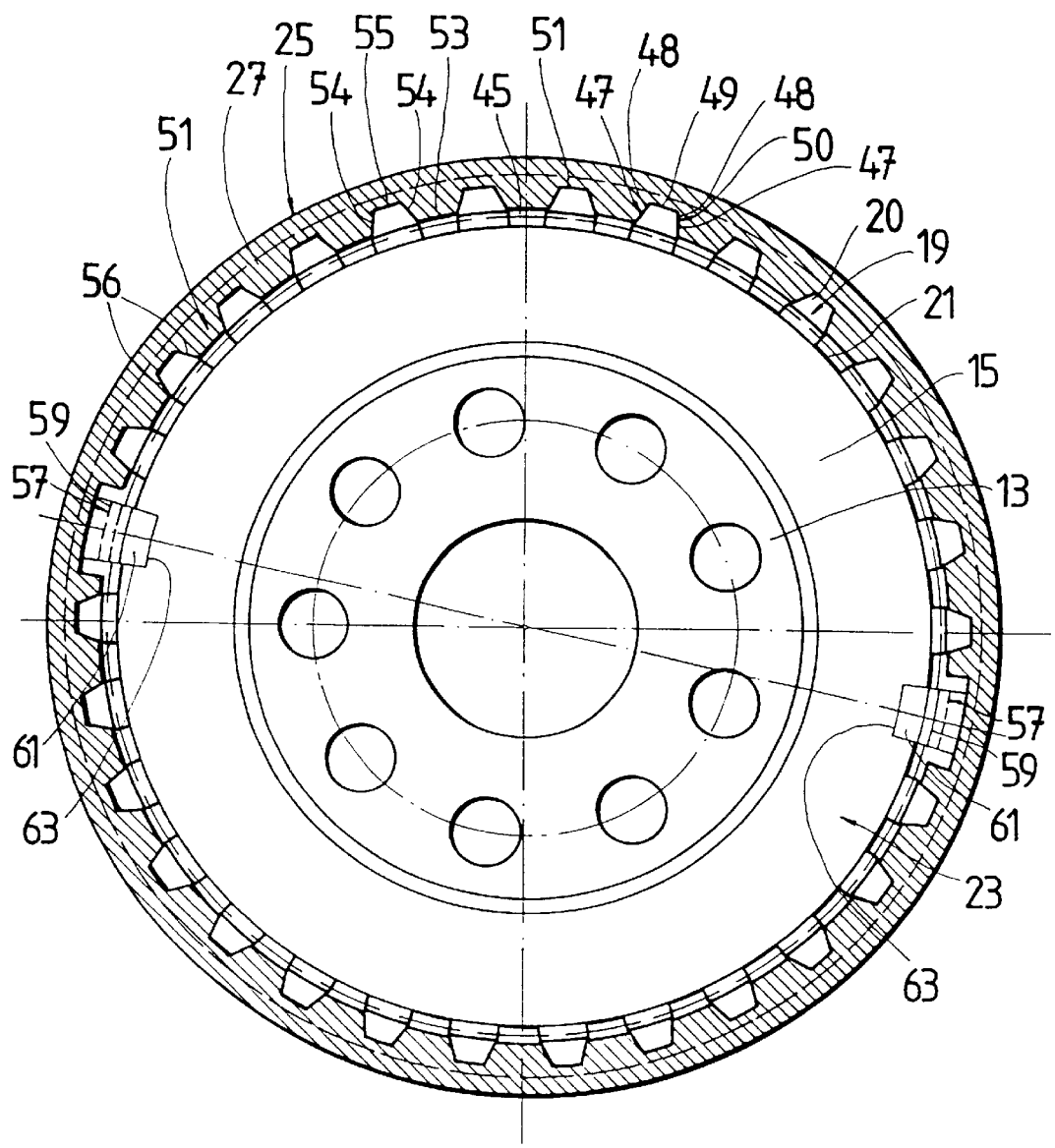
FIG. 3 is a top view of the driving gear along sectional line III—III in FIG. 1, but without attachment screws.

As FIGS. 2 and 3 illustrate more clearly, the driving gear 23, in the area of extension of its tooth system 19, has a space 45 between every two teeth 20, into which space 45 engages a tooth 53 of a tooth system (first toothed system) 51 of the accommodating fixture 25. In turn, the accommodating fixture 25 has a space 52 between every two teeth 53 of its tooth system 51, into which space 52 engages a tooth 20 of the tooth system 19 of the driving gear 23. The embodiment of a tooth 20 of the tooth system 19 can be seen in FIG. 2. The tooth 20, on the circumferential side, has tooth faces 47, which run at an angle deviating from a right angle relative to the radial axis of the tooth 20 and thus form a wedge surface 48. In the radial direction, the tooth 20 is limited by a tooth end 49. Due to its embodiment, the tooth 20 acts as a wedge 50, which engages, according to FIG. 3, into the correspondingly embodied space 52 between two teeth 53 of the accommodating fixture 25. The teeth 53 of the accommodating fixture 25, measured on their radial axis, are also embodied with an angle deviating from the vertical, so that on each tooth 53, on both sides, wedge surfaces 48 are created, which are preferably matched, with respect to inclination, to the wedge surfaces 48 of the teeth 20. Given suitable radial prestress of the teeth 20 of the driving gear 23 in the direction of the tooth base 55 on the accommodating fixture 25, the tooth 20 can be clamped in the space 52 without having reached the tooth base 55.

As mentioned above, the teeth 20 of the tooth system 19 of the driving gear 23 have a radially outward prestress. For simple mounting of the coupling device to the crank shaft 3, an assembly mechanism 70 (FIGS. 4 through 10), which is described in greater detail below, is placed on the axial shoulder 17 in the area between the bend 16 and the tooth system 19. The assembly mechanism 70 presses all teeth 20 of the driving gear 23 radially inward. Held in this fashion, the accommodating fixture 25 can be moved without axial force onto the tooth system 19 of the driving gear 23. As soon as the final axial position between the driving gear 23 and the accommodating fixture 25 is reached, the assembly mechanism 70 is detached, and therefore releases the teeth 20, whereupon the teeth 20, due to their radial prestress, spring into the tooth system 51 of the accommodating fixture 25. The aforementioned clamping connection is thereby created in the area of the wedge surfaces 48 and 54 of the teeth 20, 53. Thus, a connection free of play in the circumferential direction is established between the coupling device, i.e., the converter housing 35, and the crank shaft 3.

To maintain the converter housing 35 in this axial position, the driving gear 23, relative to its circumference, is embodied with two claws 59 offset by 180 degrees. The claws 59, which are provided instead of teeth 20 at the locations in question, are also under radial prestress. The claws 59, on their free end facing the converter housing 35, have a radial holder 61 extending in the direction of the accommodating fixture 25, which radial holder 61 can penetrate into a corresponding radial depression 63 in the ring 27 of the driving gear 23. This penetration preferably occurs when the aforementioned assembly mechanism 70 is detached and the claws 59 spring radially outward. Preferably, the radial holder 61 is embodied in a wedge-like fashion and penetrates into a similarly shaped radial depression 63. The penetration ends as soon as the claw 59 is clamped in the radial depression 63. As soon as this happens, the converter housing 35 can no longer detach itself from the driving gear 23. The claws 59 accordingly act as the axial securing means 57.

FIGS. 4 through 8 again show a sectional view comparable to that in FIG. 1. For the sake of simplicity, the tooth system 19, which was shown accurately in FIG. 1, is not shown again (with the exception of the sectional areas of the tooth system 19). The reason for this is that FIGS. 4 through 8 serve only to depict the aforementioned assembly mechanism 70. Therefore, only this element is shown with reference numbers in these drawings.

Figure 4:
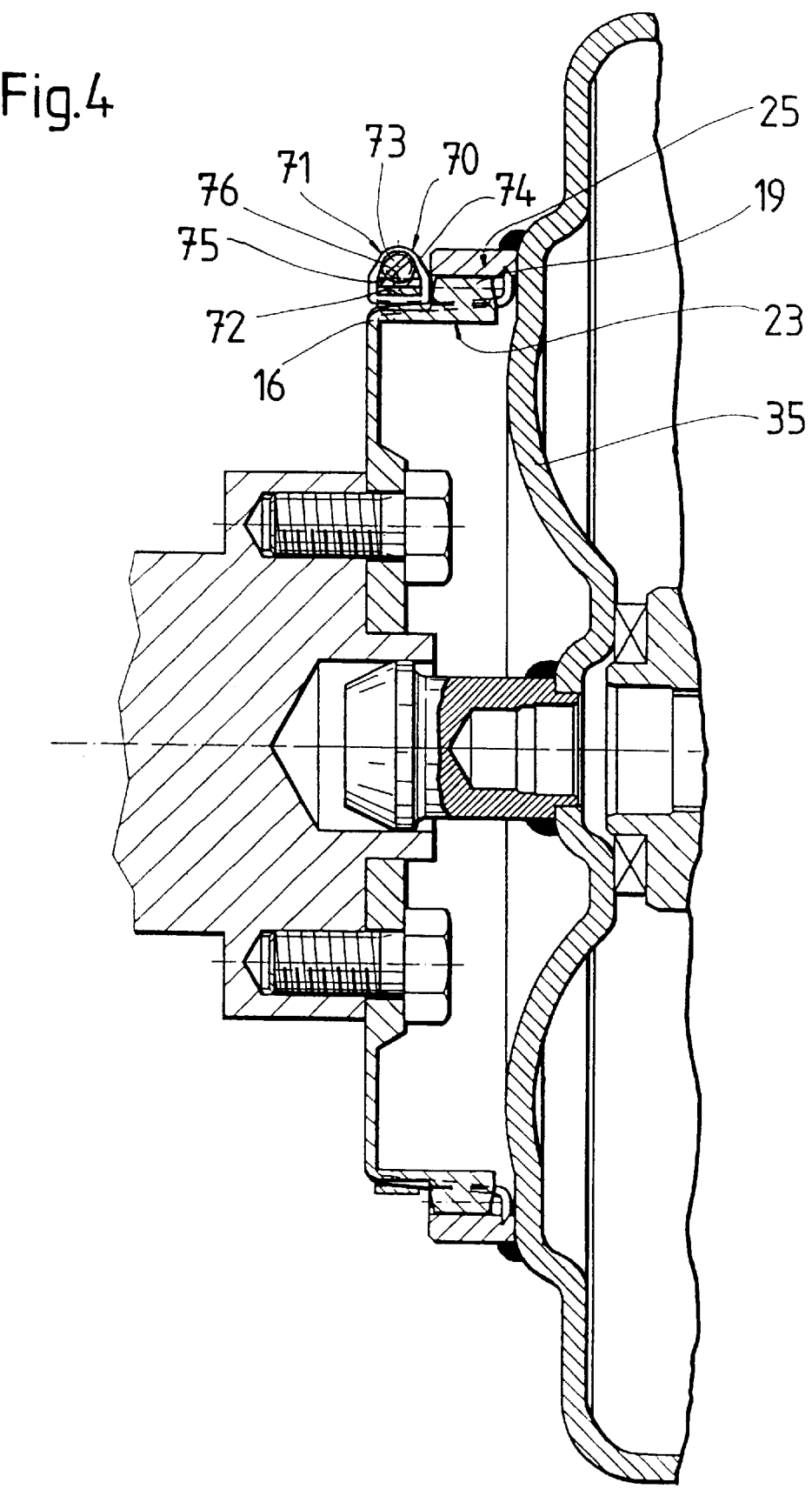
FIG. 4 shows an assembly mechanism for connecting the accommodating fixture to the driving gear, in the form of a clamping clip.

The assembly mechanism 70 shown in FIG. 4 consists of a clamping clip 71, which is arranged substantially axially between the bend 16 and the tooth system 19 of the driving gear 23 on the axial shoulder 17 of the driving gear 23 and carries, at one end of a band 72, a screw housing 74, which serves to accommodate a clamping screw 73. The clamping screw 73, with its screw thread, engages into a threaded impression 76 embodied on the free end 75 of the band 72. Therefore, upon rotational movements of the clamping screw 73, a tension force is exercised on the free end 75 of the band 72 in the circumferential direction and, as a result, the clamping clip 71 is narrowed or widened, depending on the direction of rotation of the clamping screw 73. If the rotational direction for narrowing is chosen, then, as shown in the upper half of FIG. 4, the free end 75 of the band 72 moves farther over the remaining portion of the band 72. Due to the resulting narrowing of the clamping clip 71, a radial force is transmitted from radially outside to the axial shoulder 17, via which the tooth system 19 is pressed radially inward. As soon as this occurs, the preparation for moving the accommodating fixture 25 onto the driving gear 23 without axial force is complete. After the accommodating fixture 25 has been moved, the clamping screw 73 is turned in the opposite direction. As a result, the degree of overlap of the free end 75 relative to the remainder of the band 72 is reduced, and thus the clamping clip 71 is widened. After this, the clamping clip 71 can be completely detached from the driving gear 23, or can remain in place without exercising any effect.

Figure 5:
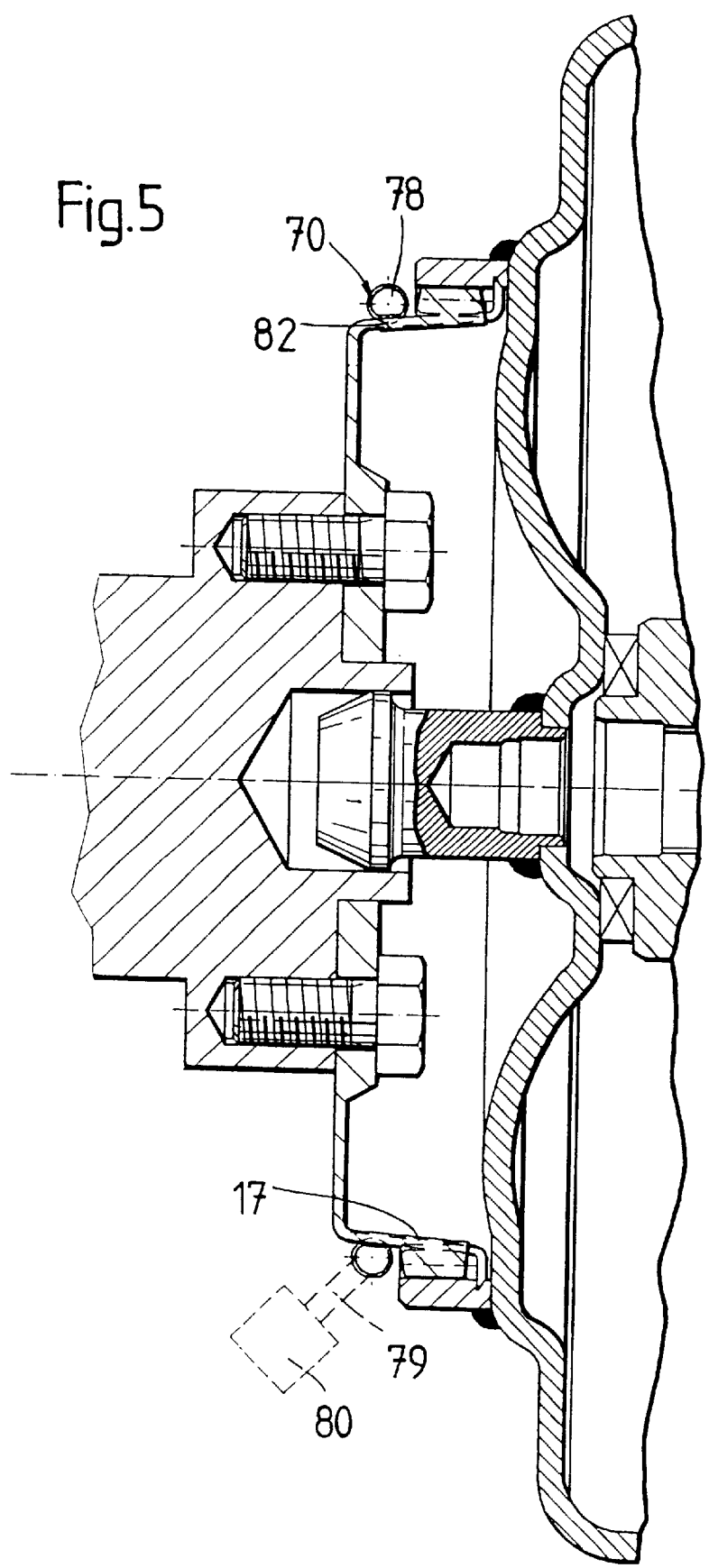
FIG. 5 is a view as in FIG. 4, but with a pressure hose.

In FIG. 5, the assembly mechanism 70 consists of a pressure hose 78, which surrounds the axial shoulder 17. According to FIG. 5, this pressure hose 78 is pressure-free and therefore has a flattening 82 on its radially inner side, which faces the axial shoulder 17. The pressure hose 78 is connectable via a pressure connection 79 to a pressure source 80 and, upon being pressurized by the latter with an overpressure, widens with respect to its cross-section and presses the axial shoulder 17 radially inward; simultaneously, the area of the flattening 82 is reduced in size. As a result, the axial shoulder 17 is brought into the form required for the assembly procedure. To terminate the effect of the assembly mechanism 70, it is only necessary to terminate the action of the pressure source 80. In this embodiment, too, the pressure hose 78 can be removed from the driving gear 23 or can remain thereupon without effect.

Figure 6:
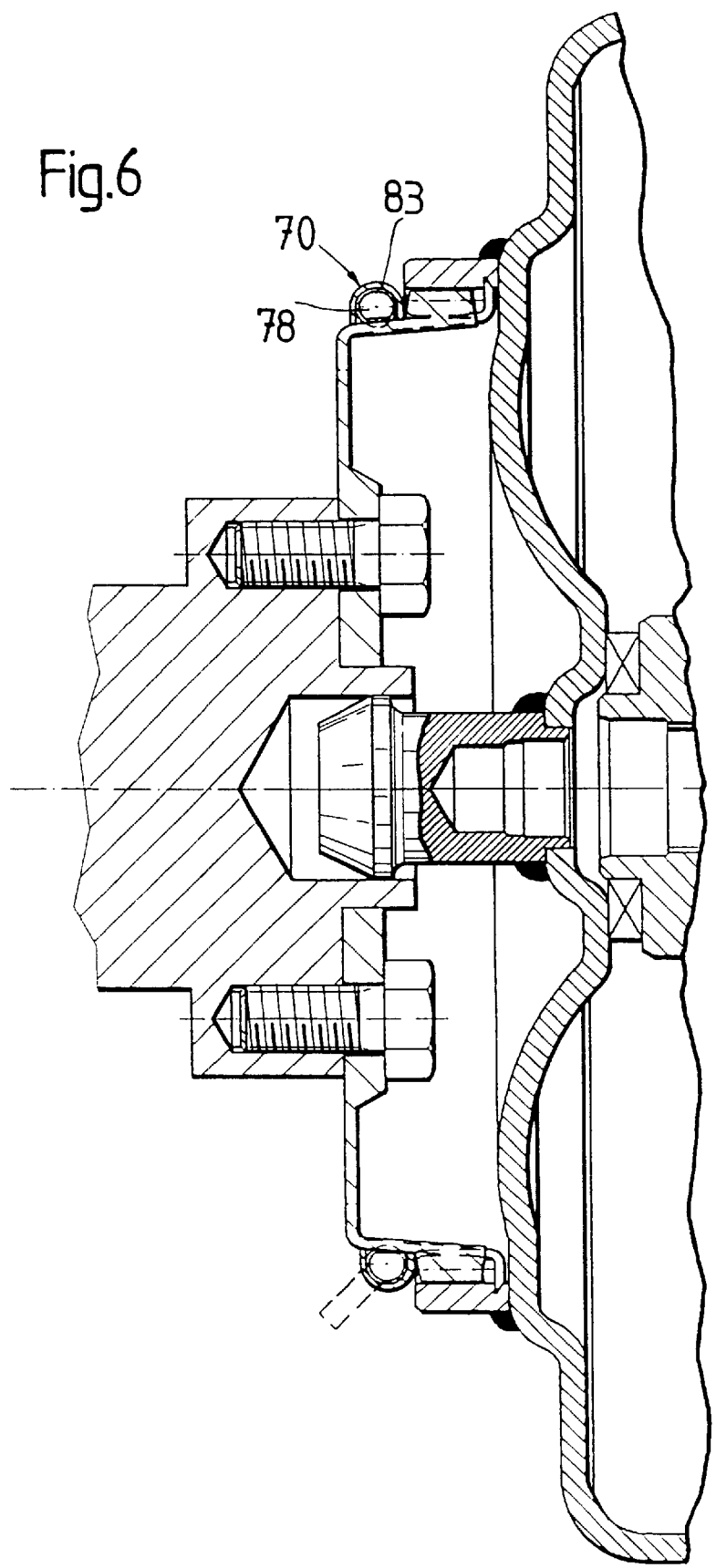
FIG. 6 is a view as in FIG. 5, but with a protective sleeve for the pressure hose.

FIG. 6 shows a modification of the embodiment in FIG. 5, wherein the pressure hose 78 is surrounded by a protective sleeve 83.

Figure 7:
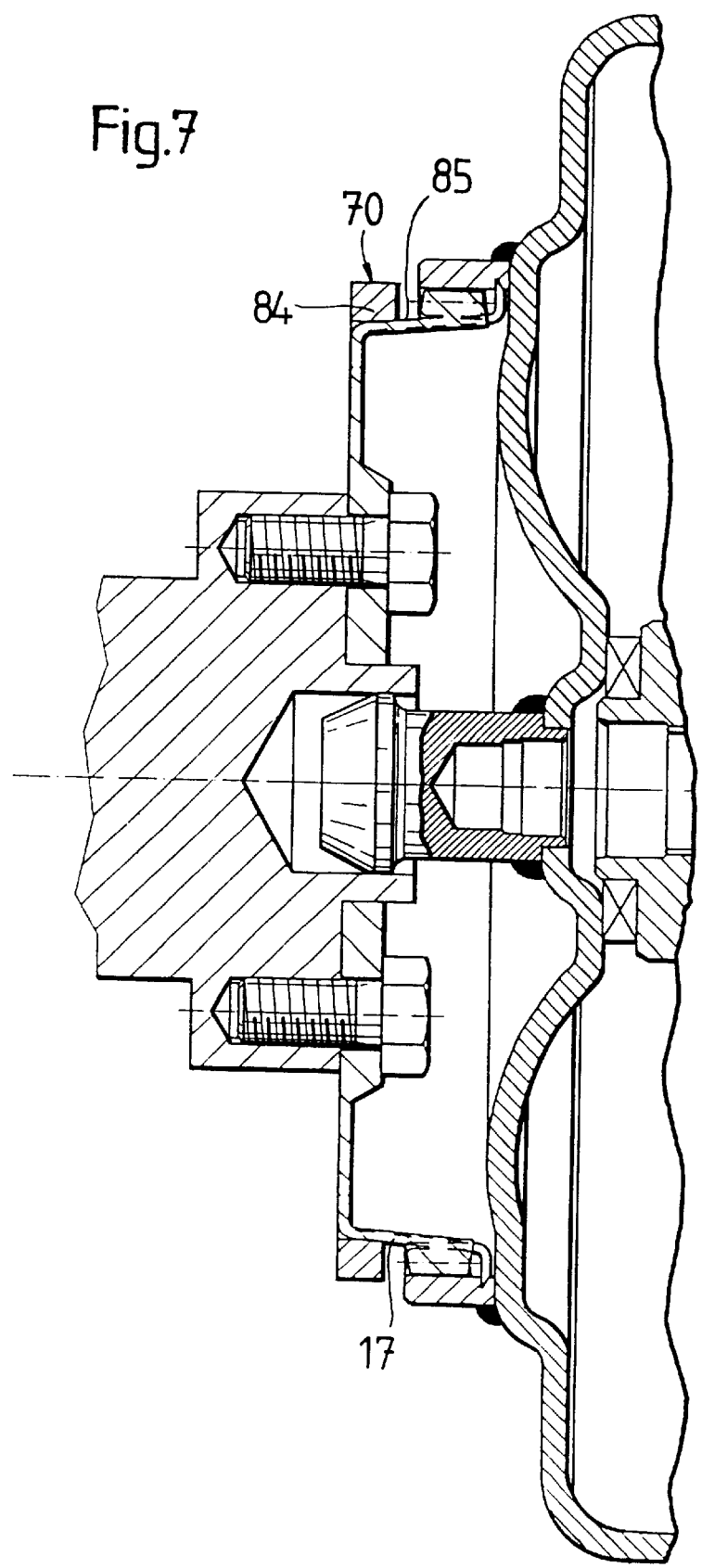
FIG. 7 is a view as in FIG. 4, but with a clamping ring.

FIG. 7 shows a clamping ring 84 that serves as the assembly mechanism 70. The clamping ring 84 is arranged in movable fashion on a conical section 85 of the axial shoulder 17. If the clamping ring 84 is moved to the right as in FIG. 7, i.e., in the widening direction for the axial shoulder 17, the clamping ring 84 compresses the axial shoulder 17 to the size of the inner diameter of the clamping ring 84. Conversely, a movement of the clamping ring 84 in the opposite direction results in an expansion of the axial shoulder 17 radially outward.

Figure 8:
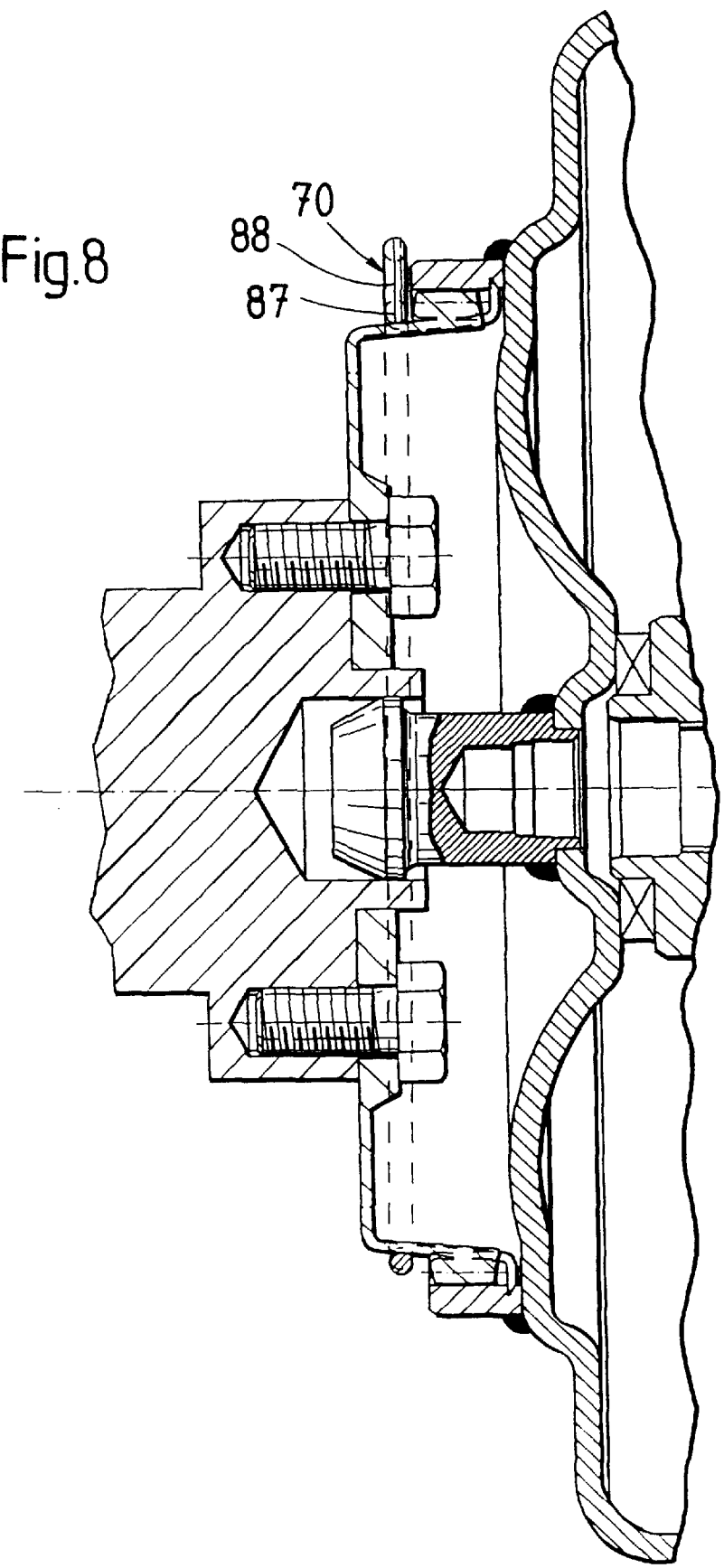
FIG. 8 is a view as in FIG. 4, but with a clamping loop.

FIG. 8 shows an embodiment of the assembly mechanism 70 with a clamping loop 87; this can be seen more clearly in FIG. 9. The clamping loop 87 has spreading ends 88, which are prestressed in such a way as to attempt to approach each other. The clamping loop 87 assumes the diameter shown by the solid lines. After a tool (not shown) is placed on the spreading ends 88, the latter can be drawn one atop the other in the circumferential direction, until reaching the position shown by the broken lines. The clamping loop 87 is then narrowed, with respect to its diameter, and presses the axial shoulder 17 radially inward. To terminate the effect of this clamping loop 87, it is merely necessary to remove the tool (not shown) from the spreading ends 88. The spreading ends 88 then spring back into their original position and thus relieve the axial shoulder 17.

FIG. 10 shows another method of operating the clamping loop 87. A tool 90 is placed from radially outside onto the axial shoulder 17. The tool 90 has pieces 93 that, in the areas of a holding end 91 and a tension end 92, hold the loop 87 in radial contact with the axial shoulder 17. The holding end 91 is introduced into and held in one of the pieces 93 (namely, the piece 93 on the right in FIG. 10), while the tension end 92 is held in a tension means 94. The tension means 94 can be, for example, a clamp. As soon as the tension means 94 moves in the direction of the arrow shown in FIG. 10, the loop 87, secured at the holding end 91, narrows from the position shown by solid lines to the position shown by broken lines, and thus exercises a narrowing radial force on the axial shoulder 17. Conversely, to relieve the loop 87, the tension means 94 is moved in the reverse direction.

Figure 11:
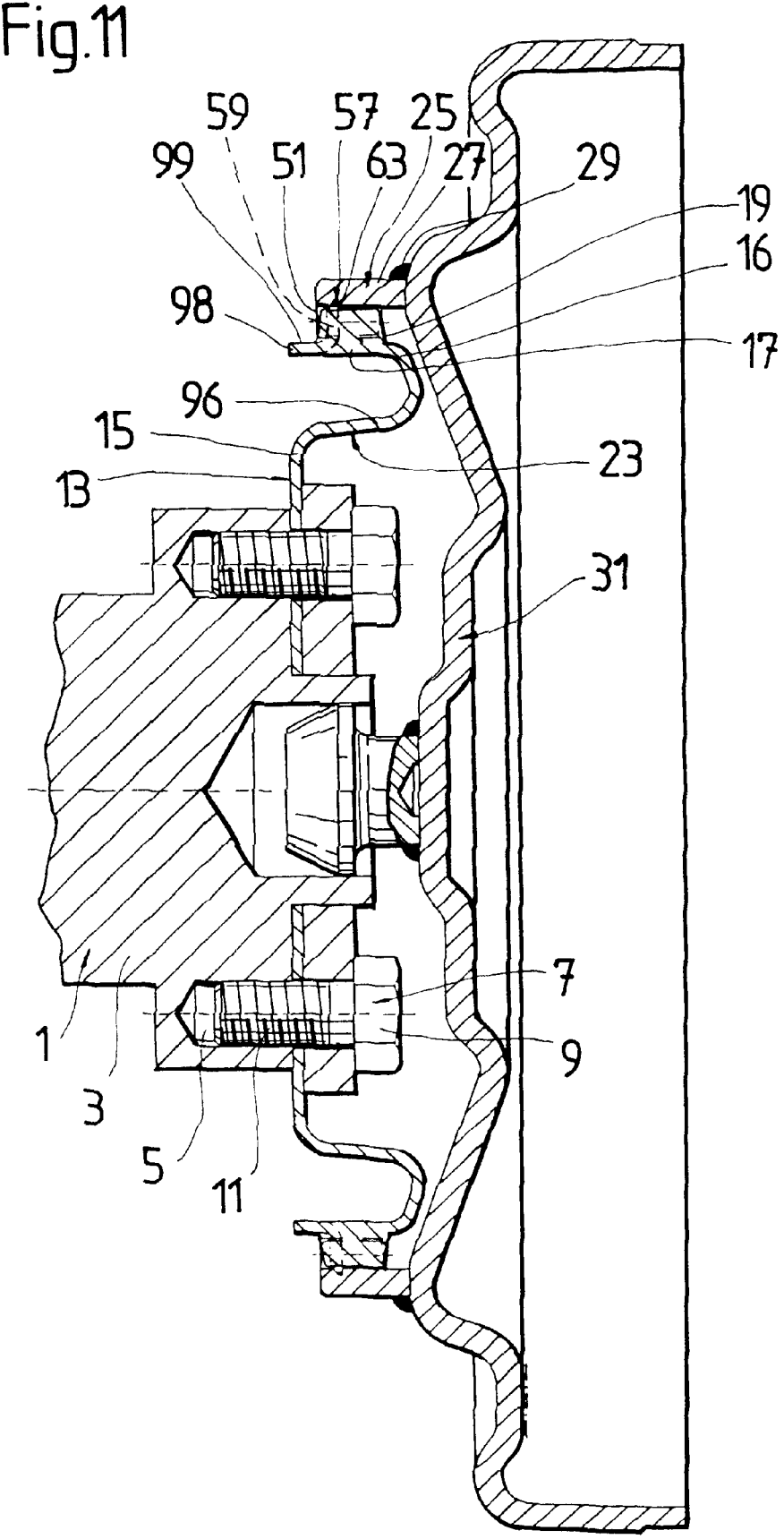
FIG. 11 is a view as in FIG. 1, but with a different embodiment of the driving gear.

In FIG. 11, the main focus is on the embodiment of the radial flange 13, which illustrates the essential difference from the embodiment in FIG. 1. The axially elastic flange 15, radially outside of its diameter (which serves for attachment to the crank shaft 3), is embodied with a spring coil 96, which in cross-section has roughly the shape of the letter "C" turned sideways. The radially outer leg of the spring coil 96 is comparable to the axial shoulder 17 described in reference to FIG. 1, and carries, in the axially middle area of its outer circumference, the tooth system 19. In the direction of the crank shaft 3, there follows, relative to the tooth system 19, an axially free end 98, which on its outer circumference has a support surface 99 for an assembly mechanism 70 as shown, for example, in FIGS. 4 through 10. In addition, attached to this free end 98 is an axial securing means 57, which, with a claw 59, engages in a known manner into a radial depression 63 in the accommodating fixture 25. Due to its attachment to the free end 98 of the axial shoulder 17, the claw 59 engages into the corresponding radial depression 63 in the axial extension area of the tooth system 51 of the accommodating fixture 25, so that the available axial structural space is fully used. At the same time, thanks to the lever effect of the free end 98 relative to the bend 16 of the axially elastic flange 15, a relatively small assembly force needs to be exercised by the aforementioned assembly mechanism 70 to overcome the relatively high radial prestress force that can advantageously be produced, due to the design of the spring coil 96, on the driving gear 23.

Figure 12:
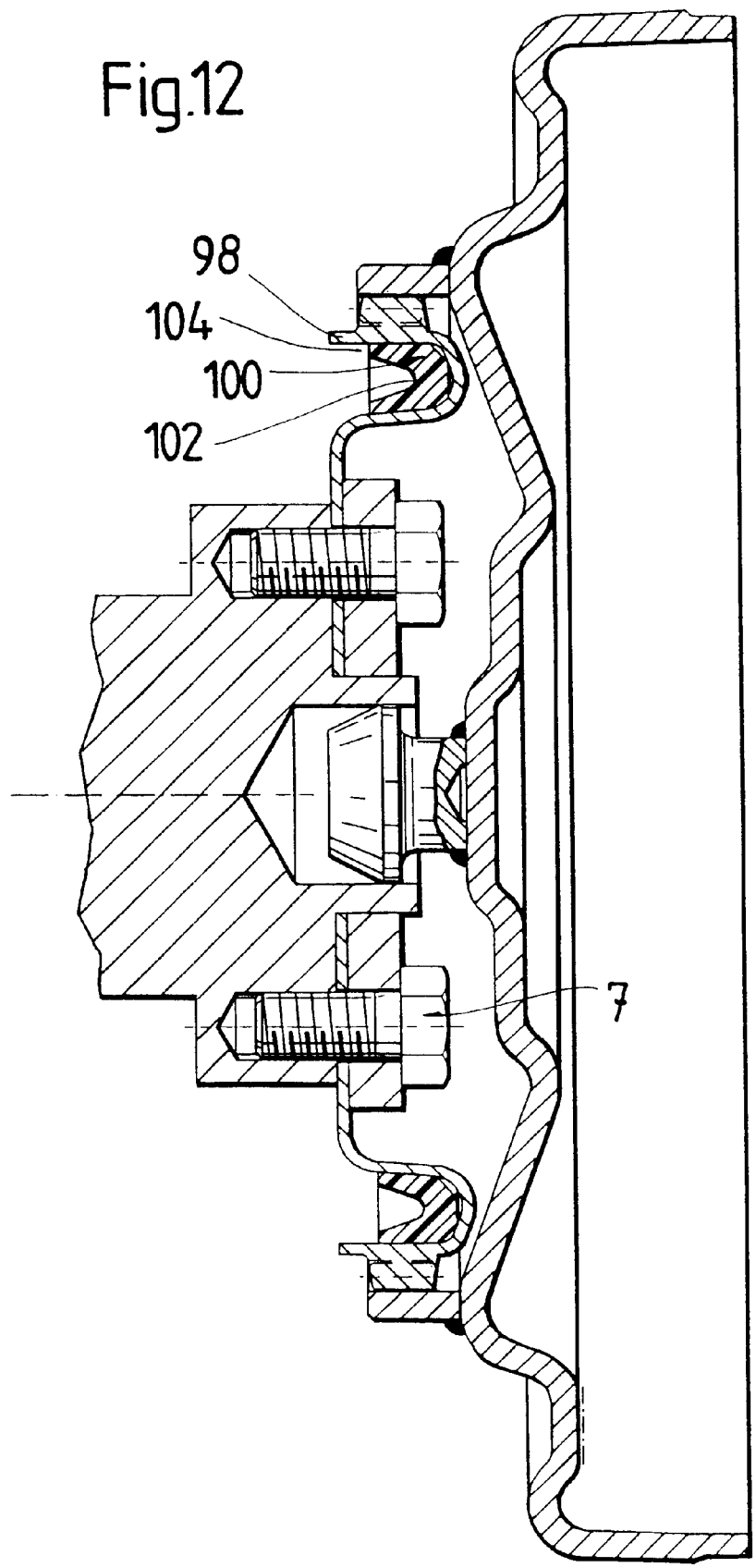
FIG. 12 is a view as in FIG. 11, but with additional damping means.

In addition to the embodiment in FIG. 11, FIG. 12 shows damping means 100 in the form of an elastomer 102, which can be placed into an empty space 104 of the spring coil 96 of the radial flange 13. An annular embodiment of the elastomer is conceivable, as are individual elastomer elements arranged at predetermined circumferential distances from each other.

Figure 13:
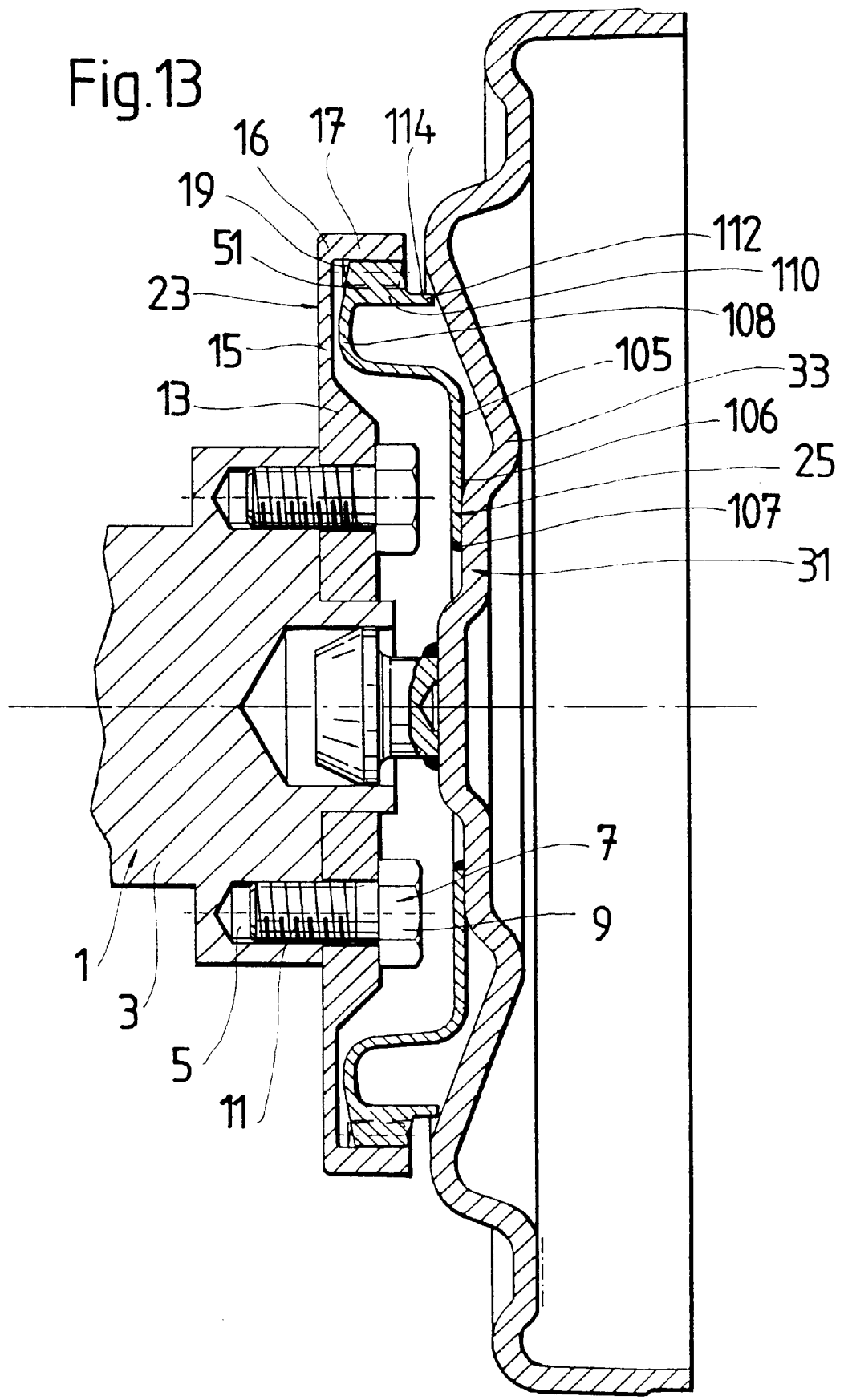
FIG. 13 is a view as in FIG. 1, but with a different embodiment of the driving gear and accommodating fixture.

In the above-described embodiments, the accommodating fixture 25 has always surrounded the driving gear 23 in annular fashion. However, FIG. 13 shows a different embodiment, in which the accommodating fixture 25 consists of a support 105, which is attached by means of a weld seam 107 to the primary flange 33 of the converter housing 35. The support 105 is embodied as an axially elastic flange 106 and, in the radially outer area, is equipped with an elastic spring coil 108. In the embodiment in FIG. 13, this coil 108 acts in cross-section like the letter "C," whereby the radially outer leg of the spring coil 108 serves as the axial shoulder 110, which, in the circumferential area, carries the tooth system 51 of the accommodating fixture 25 and has, facing the converter housing 35, a free end 112, which is equipped on the radial outside with a support surface 114 for an assembly mechanism 70 as described, for example, in reference to FIGS. 4 through 10. This assembly mechanism 70 allows the free end 112, due to its lever arm, relative to the axially elastic flange 106, to be smaller than the radial prestress force that presses the tooth system 51 radially outward into the tooth system 19 embodied on the inner circumference of the axial shoulder 17 of the driving gear 23. It is also possible in this embodiment, due to the relatively high radial force between the tooth systems 19, 51, to dispense with additional axial securing means.

FIGS. 14 through 23 depict a further embodiment of the assembly mechanism 70, which can be used, in particular, with the embodiment of the driving gear 23 also shown in FIGS. 14 through 23. However, it should be noted that this assembly mechanism 70 can also be used with the embodiments of the driving gear described above, particularly with the embodiments shown in FIGS. 11 through 13.

It can be seen that, in contrast to the above variants of the driving gear 23, which can be made of spring steel, for example, this embodiment has a central disk-like area 115, to which a plurality of spring-type tongues 116 are consecutively attached in the circumferential direction. Each of the tongues 116, in its radially outer area, carries one tooth of the tooth system 19, each of which can have the configuration described in detail above. In particular, each of the spring tongues 116 again has an axial shoulder 17, which carries a tooth extending radially outward. Further, each tooth of the tooth system 19 is associated with a space between two teeth of the tooth system 51 on the accommodating fixture 25, so that the teeth of the tooth systems 19, 51 can be brought into engagement in the manner described earlier. Of course, even in such an embodiment of the driving gear 23, an axial fixing means can be provided, as described, for example, with reference to FIG. 11.

The assembly mechanism 70 shown in FIGS. 14 through 23 comprises two ring elements 110, 112, which are carried rotatably on the support surface 99 in the area of the free end 98 of the axial shoulder 17. Specifically, the ring elements 110, 112 are held on the individual axial shoulders 17 axially between the teeth of the tooth system 19 and a fixing projection or securing projection 120, which can be produced, for example, by the deformation, calking or the like of the free end 98 of the axial shoulder 17. In other words, the driving gear 23 can form, with the rings 110, 112, a preassembled unit, which is produced by bending the individual springs or spring tongues 116 radially inward with a further tool, slipping on the ring elements 110, 112, and then releasing the spring tongues 116 until the rings 110, 112 are held in the form shown on the driving gear 23. As depicted in the detailed views in FIGS. 18, 19 and 20, which show the embodiment of the two ring elements 110, 112, these ring elements 110, 112 have, on their inner circumferential areas 124, a deformation formation 122. The deformation formation comprises a deformation bevel 126 associated with each tooth of the tooth system, i.e., each spring tongue 116, on the ring element 110. The deformation bevel 126 extends in the circumferential direction and is followed in the circumferential direction by areas 128 or 130 with an approximately constant distance from the rotational axis A. Following the area 130 in the circumferential direction, there is a step 132 and, after this, another area 128. Similarly, the ring element 112 (largely covered in FIG. 20) has a deformation bevel 134 associated with each tooth of the tooth system 19, i.e., each spring tongue 116. The deformation bevel 134 is again followed by areas 136, 137 with an approximately constant distance to the rotational axis A. The two rings can be identical in structure and can be placed, rotated relative to each other, one atop the other, so that, in the end, the arrangement shown in FIG. 20 is obtained, wherein the two bevels of a pair of deformation bevels 126, 134 extend in opposite directions but are nonetheless associated with each other.

Figure 18:
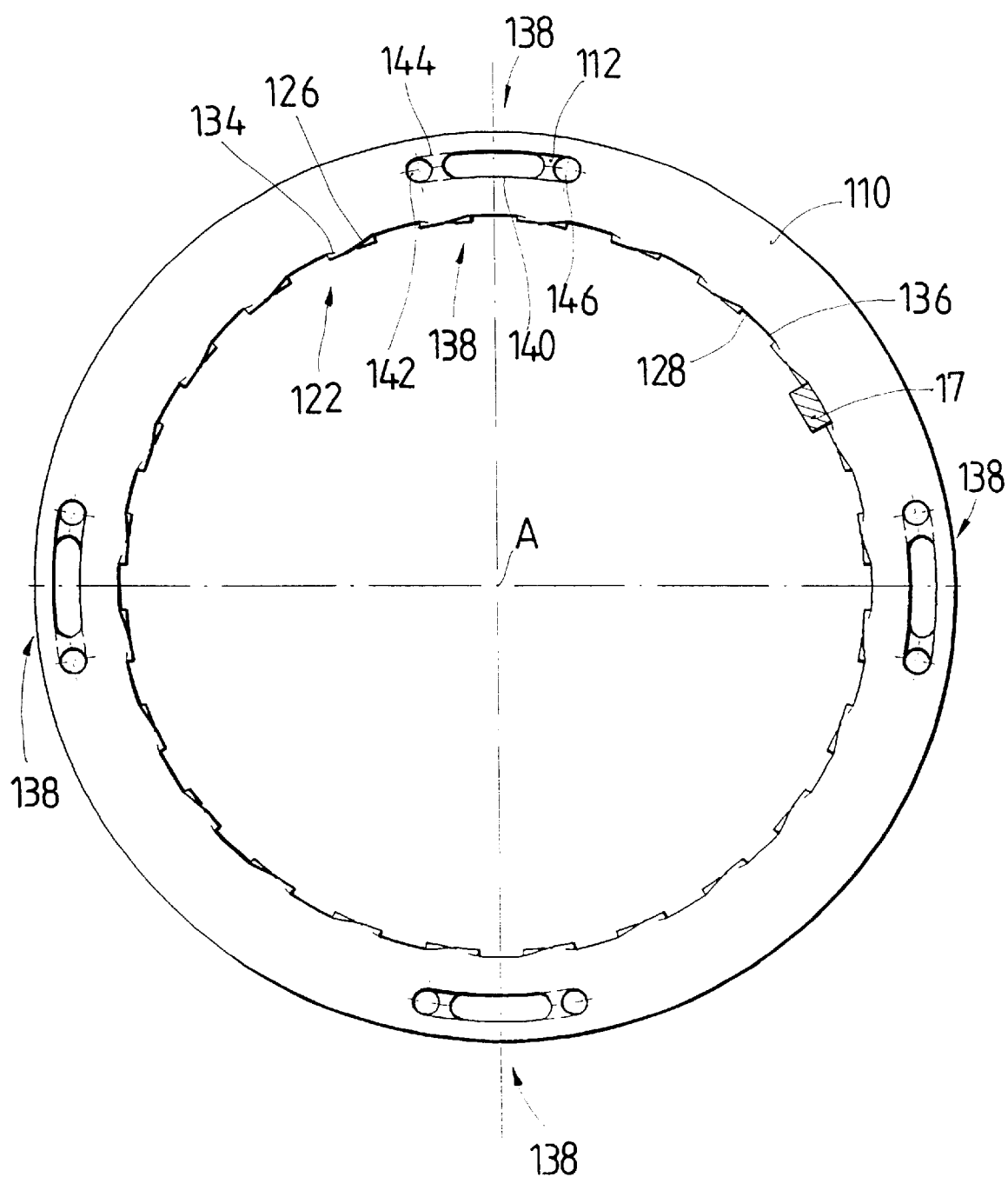
FIG. 18 is an axial view of the two rings of the assembly mechanism, lying one atop the other.

As shown in FIGS. 18 and 19, in particular, each ring element 110, 112 has, at multiple circumferential positions, a grasping formation 138 for an activation tool. The grasping formations 138 on the ring element 110 comprise a slot 140 followed by an opening 142. Similarly, the grasping formation 138 on the ring element 112 comprises a (partially covered) slot 144 followed by an opening 146. Because the two ring elements 110, 112 are identical to each other and are arranged in opposite senses to each other, the slot 140 of the ring element 110 lies, in part, over the slot 144 of the ring element 112 and, at the same time, uncovers the opening 146 of the ring element 112. Similarly, the opening 142 of the ring element 110 lies over the partially shown part of the slot 144 of the ring element 112.

Figure 15:
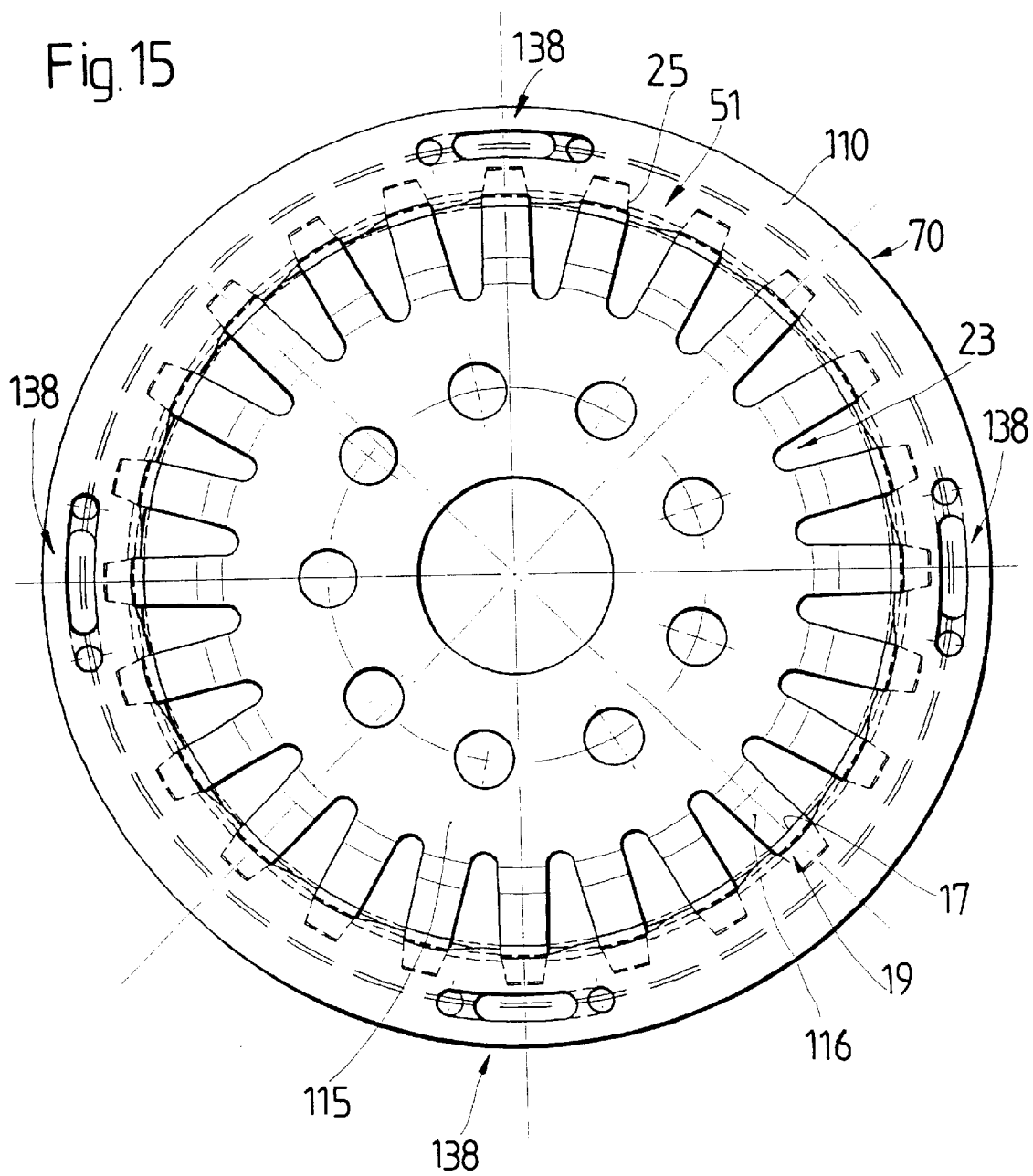
FIG. 15 is a simplified axial view of the drawing in FIG. 14, showing FIG. 14 from the right, in the coupled state.
Figure 17:
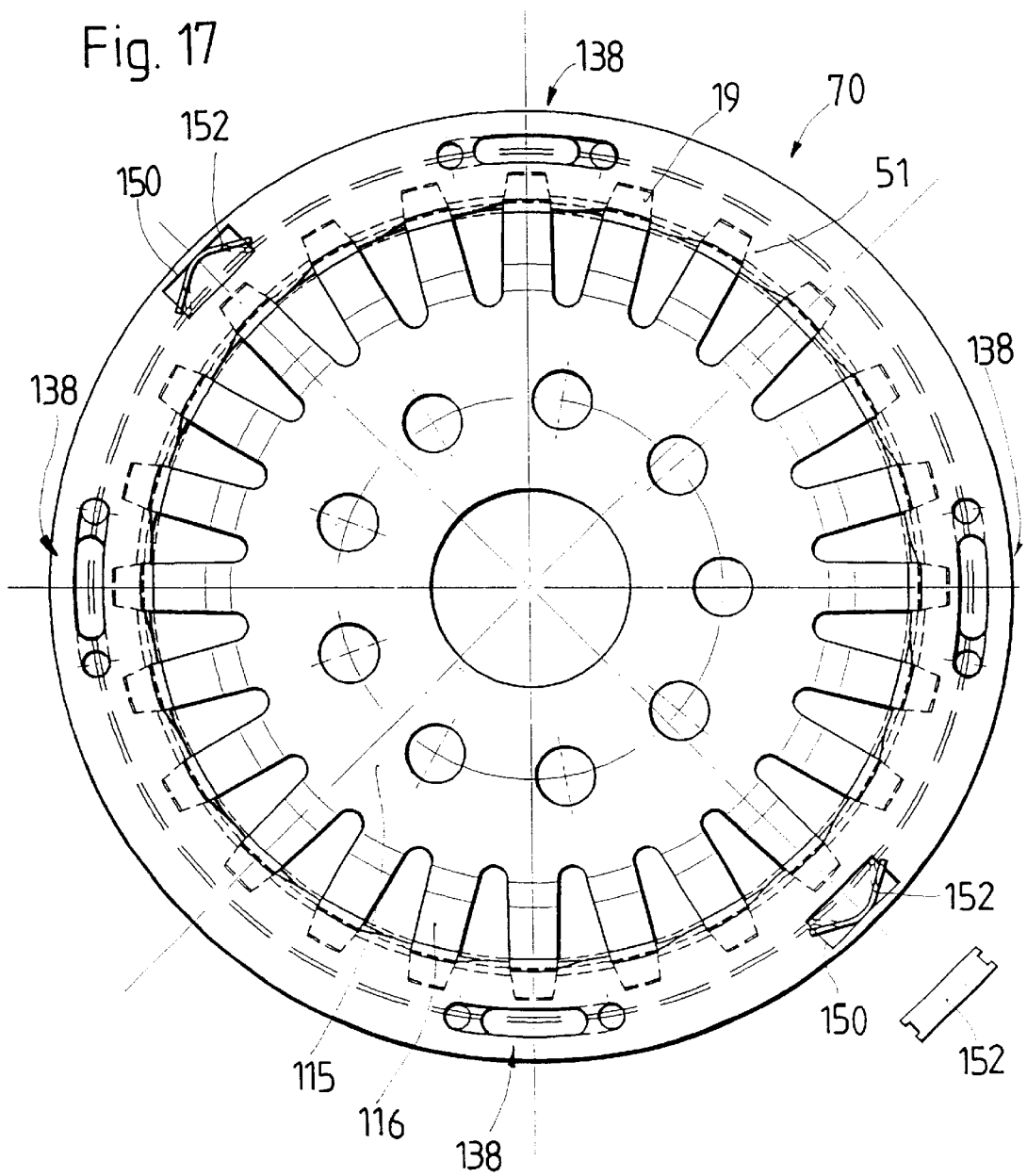
FIG. 17 is a view corresponding to FIG. 15, in which additional prestress elements can be seen.

The activation tool can comprise, for example, two approximately parallel pins or sections that can be brought near to each other; for example, they can be spring end sections connected via a spiral or screw spring coil. For the purpose of activation, these two sections are inserted into the openings 142, 146 in the ring elements 110, 112 accessible via the slots 140, 144. When the two sections are drawn near to each other, the two ring elements 110, 112 are rotated relative to each other in the circumferential direction. Because the sections of the activation tool penetrating the openings 142, 146 also engage into the slots 144, 140 of the other ring element 112, 110, the rotatability of the two ring elements 110, 112 is not hindered, even when the two end sections are inserted all the way through the openings 142, 146. It should be noted that FIGS. 18, 19 and 20 depict a state in which the axial shoulders 17 of the spring tongues 116 lie in the area of the sections or areas 128, 136, i.e., are moved radially outward. This state is also shown in FIGS. 15 and 17. As these drawings show, the teeth of the tooth system 19 engage substantially completely between the teeth of the tooth system 51.

Figure 22:
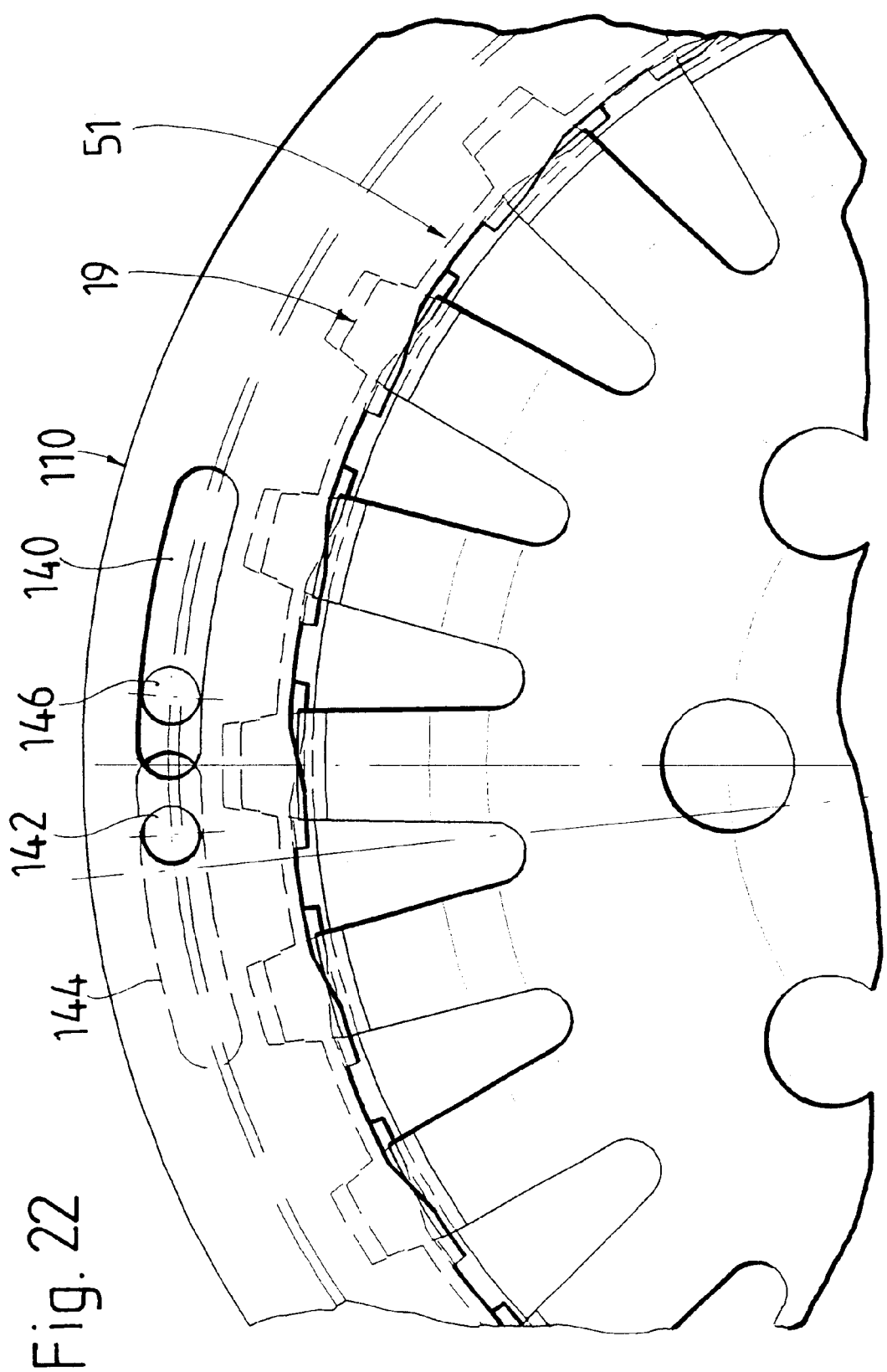
FIG. 22 is an enlarged section from FIG. 16.
Figure 23:
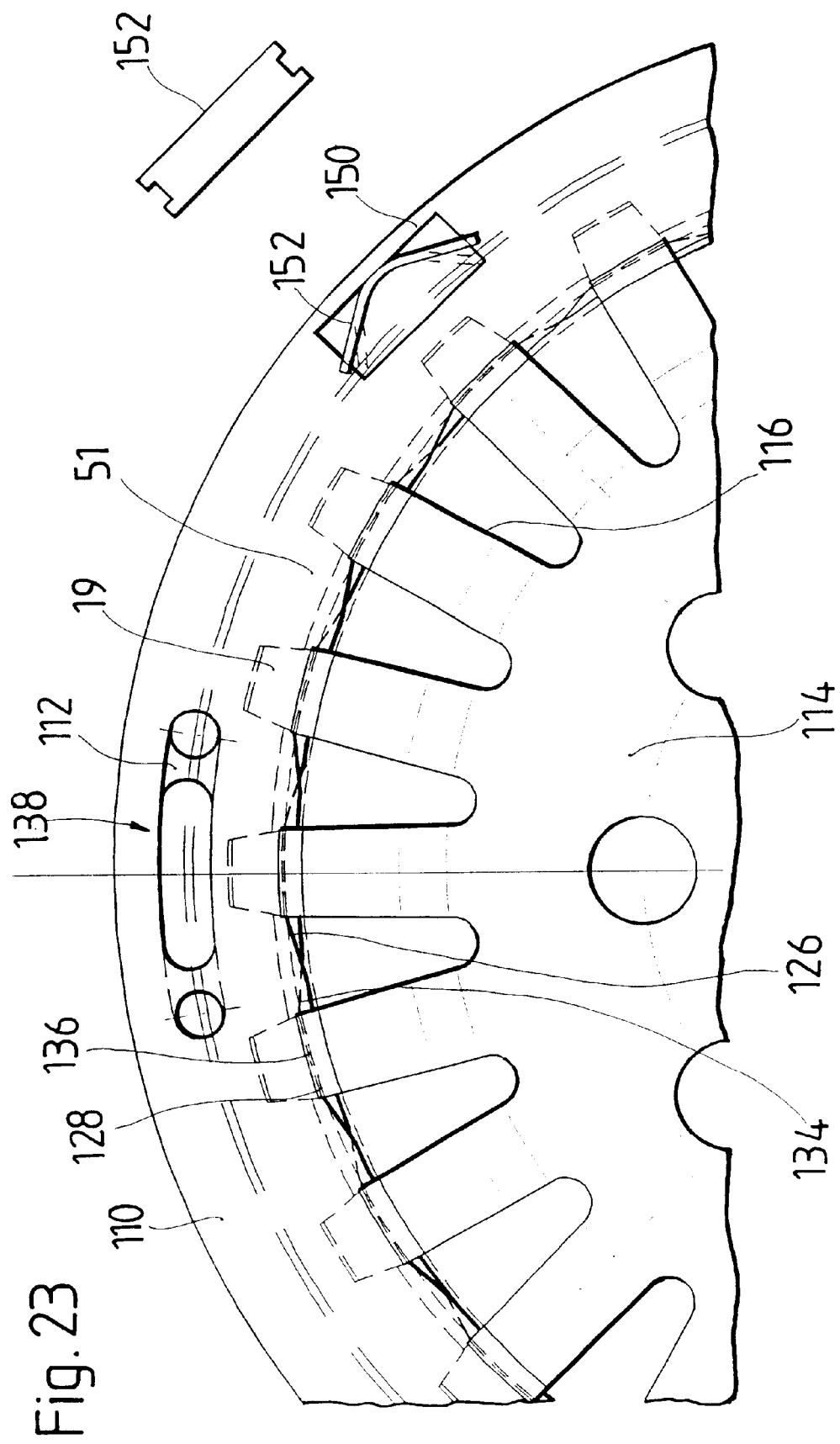
FIG. 23 is an enlarged section from FIG. 17.

As shown, for example, in FIGS. 17, 19 and 22, the two ring elements 110, 112 can have recesses 150, which are associated with each other and, in the relative rotational positions shown in FIGS. 17, 19 and 22, lie one above the other. Located in these recesses 150 are substantially H-shaped leaf spring elements 152, which, via axial indentations or depressions 154, 156, axially hold together the two ring elements 110, 112 and, in addition, prestress the ring elements 110, 112 into the relative rotational positions shown in FIGS. 17, 19 and 22.

Figure 14:
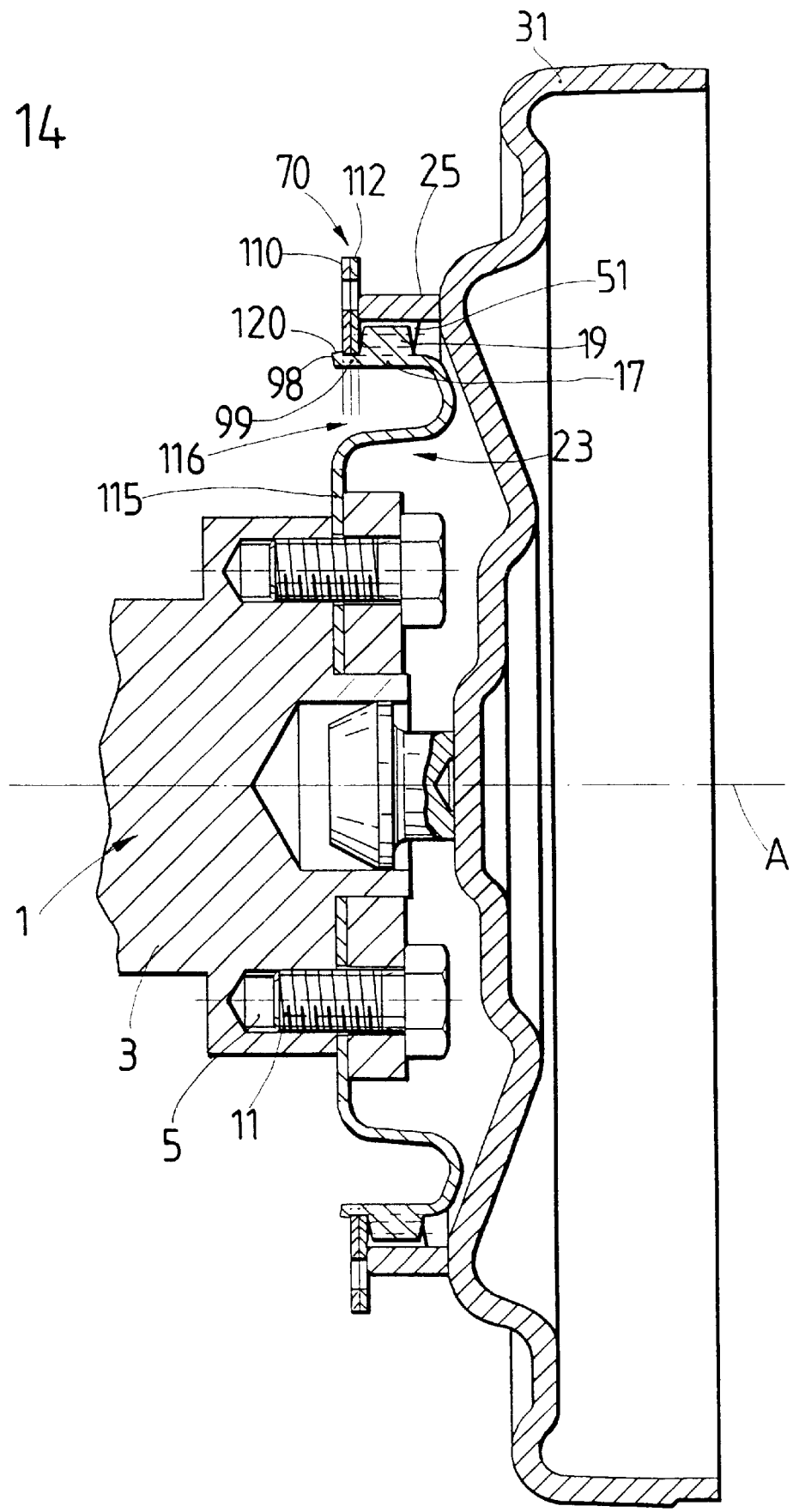
FIG. 14 is a view corresponding to FIG. 11, with an alternative embodiment of an assembly mechanism.
Figure 16:
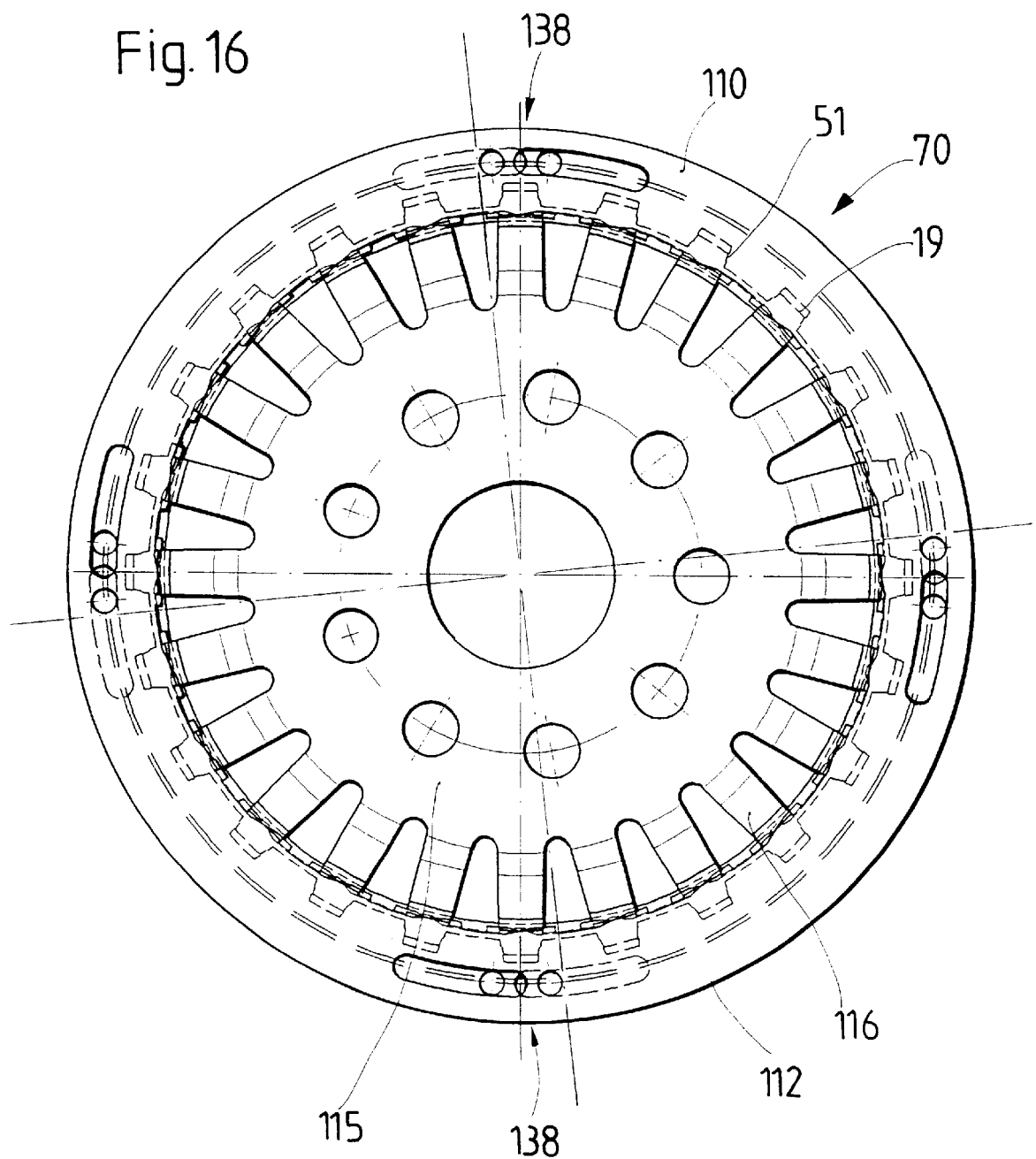
FIG. 16 is a view corresponding to FIG. 15, but with the coupled state not established.

Starting, for example, from the position shown in FIG. 14, in which the two tooth systems 19, 51 internesh completely with each other, to detach this coupled engagement state, in which the two ring elements 110, 112 assume the relative positions shown in FIGS. 15, 17, 18, 19, 20 and 23, an activation tool is inserted, with its two sections, into at least one of the grasping formations 138, i.e., one section is inserted into each of the openings 142, 146. Then, against the prestress of the leaf spring elements 152 (if these are provided), the two sections of the activation tool are brought near to each other in the circumferential direction. As a result, the sections engaging into the openings 142, 146 move in the slots 140, 144 in the respective ring elements 110, 112 until, finally, the relative rotational positions of the ring elements 110, 112 shown in FIGS. 16 and 22 are reached. When this relative rotation occurs, the individual deformation bevels 126, 134, each of which is associated with a tooth of the tooth system 19, move along an associated outer edge of the support surface 99 of the axial shoulder 17, so that this outer edge—and thus the entire axial shoulder 17—is pressed radially inward. As a result (FIG. 22), the teeth of the tooth system 19 are also moved radially inward. Thus, the reciprocal radial prestress between the tooth systems 19, 51 is terminated and, thanks to the wedge-shaped embodiment of the tooth systems, a slight axial relative movement of the tooth systems, i.e., of the driving gear 23 and the accommodating fixture 25, is permitted. After the axial removal of the driving gear 23 and the accommodating fixture 25, the tool inserted into the openings 142, 146 can be released, so that the ring elements 110, 112 are again rotated relative to each other, via the action of the leaf spring elements 152, in such a way that the deformation bevels 126, 134 slide on the support surface area 99 in opposite directions. The axial shoulders 17 are moved radially outward by the spring elasticity of the spring tongues 116 until, finally, the tooth system 19 again reaches the position shown in FIGS. 15, 17 and 23, but now without engaging into the tooth system 51.

An arrangement could also be created, for example, that does not have the leaf spring elements 152, but instead ensures that, in the state shown in FIG. 22, the areas 130, 137 are not aligned with the support surface 99 in the circumferential direction, but the deformation bevels 126, 134 continue to act on the axial shoulders 17. As a result, after the release of the two ring elements 110, 112 via withdrawal of the activation tool, the ring elements 110, 112, due to the outwardly directed prestress of the axial shoulders 17, are necessarily rotated into the position shown, for example, in FIG. 23. It is therefore possible, in such an embodiment, to completely dispense with the areas 130, 137.

It should also be pointed out that when the spring tongues 116 or axial shoulders 17 reach the inwardly displaced positions shown in FIG. 22, for example, the ring elements 110, 112 cannot fall off the driving gear 23, because the securing projections 120 ensure that the rings 110, 112 are axially held.

At the same time, it can be seen that, in the assembled state, the ring elements 110, 112 can define an axial stop for the accommodating fixture 25, i.e., the positions of the accommodating fixture 25 and driving gear 23 moved toward each other to the maximum extent. Of course, as explained above, axial securing means can thereby be provided in the area of the tooth systems. The axial clamping of the ring elements 110, 112 between the accommodating fixture 25 and the securing projections 120 has the advantage that, during operation, it is possible to avoid rattling noises caused by the ring elements 110, 112 hitting against each other, even when the ring elements 110, 112 remain permanently on the driving gear 23 in the assembled state.

Figure 24:
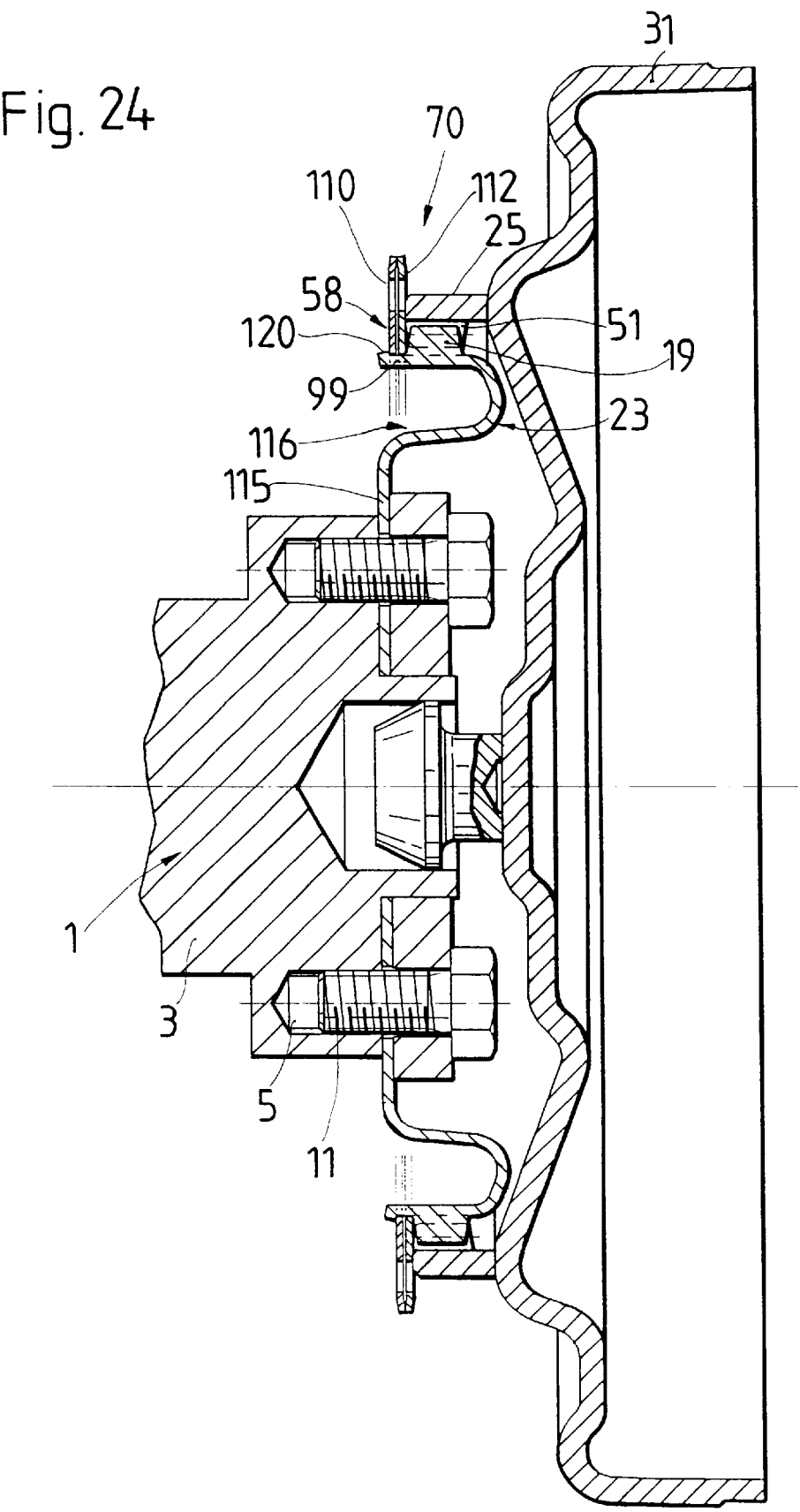
FIG. 24 is a view as in FIG. 14 of a further alternative embodiment of the assembly mechanism.

A modification of the above-described embodiment is shown in FIG. 24. The structure differs from those described above only in that the two ring elements 110, 112 of the assembly mechanism 70 are curved toward each other in their radially outer areas, so that a dish-like structure results. As a result, an additional force component that moves the two ring elements 110, 112 apart axially is introduced and, in interaction with the axial relaxation between the accommodating fixture 25 and the securing projections 120, provides improved protection against rattling noises.

Figure 25:
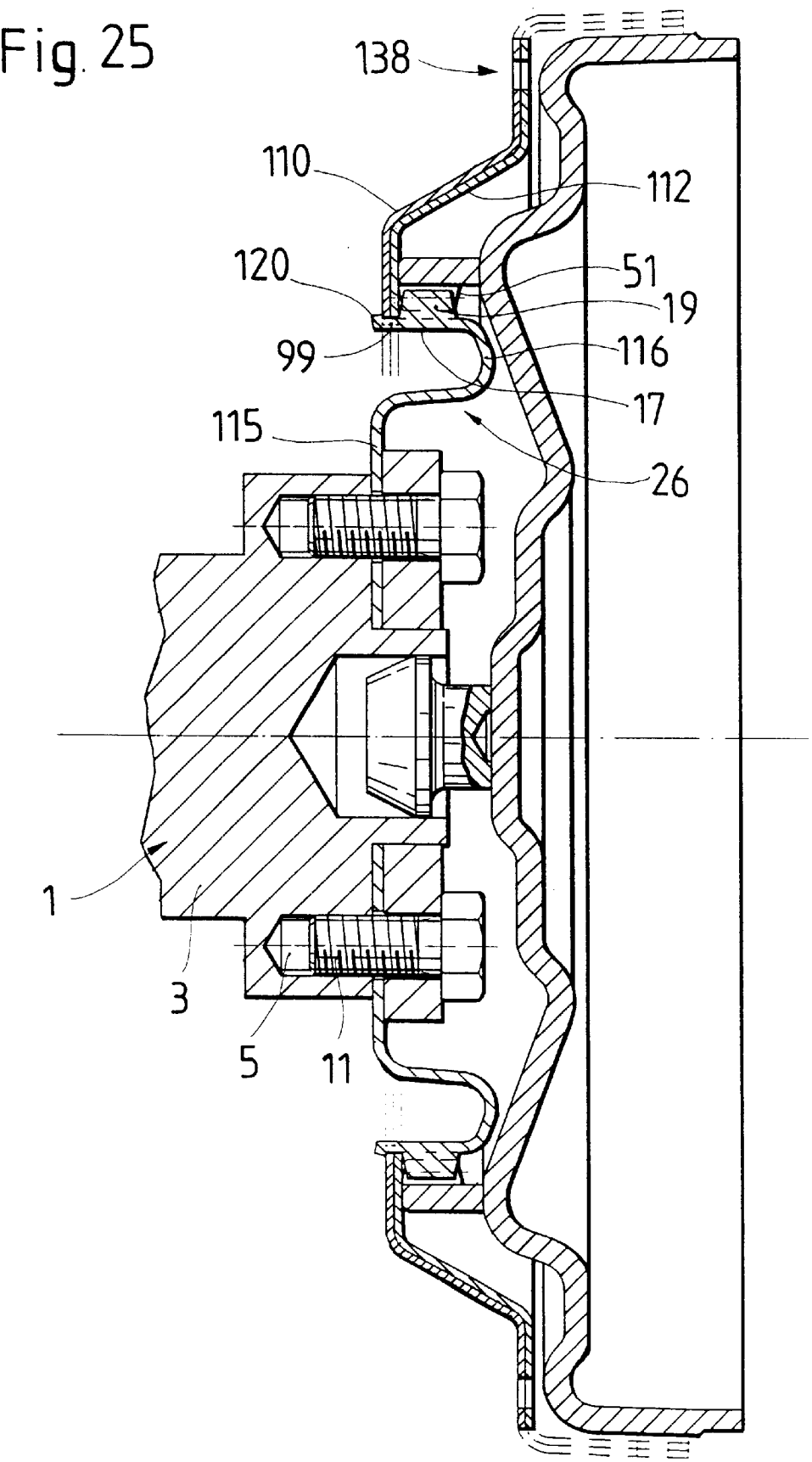
FIG. 25 is another view as in FIG. 14 with a further embodiment of an assembly mechanism according to the invention.

FIGS. 14 and 24 show embodiments in which the ring elements 110, 112 can be stamped as stamped parts from sheet metal. FIG. 25 shows an embodiment in which the ring elements 110, 112 are embodied as drawn parts, for example, and assume a roughly pot-shaped structure. This means that the ring elements 110, 112 initially extend radially outward from their area of interaction with the axial shoulder 17, are then beveled slightly radially outward in the axial direction, and then pass into a further radially extending area, where the individual action formations 138 for the tool can be located, and from there extend further in the axial direction, as indicated by the dashed line. The advantage of such an embodiment is that greater freedom of choice exists with respect to the area where the grasping formations 138 are to be arranged. For example, when these grasping formations 138 are arranged farther radially outside, they are more easily accessible to the activation tool. It is possible here to arrange the grasping formations 138 in the radially outer and axially extending area. This has the further advantage that, due to the lever ratios thus created, the force required to deform the individual spring tongues 116 radially inward can be more easily produced.

It should be noted that the individual grasping formations 138 are provided at an angular distance of 90 degrees, as shown, so that the ring elements 110, 112 can be acted upon from different circumferential areas. However, any other desired positioning is possible, as are any other number of grasping formations. Similarly, with respect to the leaf spring elements 152, which are preferably arranged in pairs at an angular distance of 180 degrees, any other desired number of such prestress elements is conceivable.

Fundamentally, it should be noted that the depicted embodiment of the assembly mechanism 70 with two ring elements 110, 112 is especially preferred, because, in this case, a relative rotational movement, and thus the activation of the axial sections 17, can be attained by simply moving two sections of an activation tool toward each other. However, an assembly mechanism 70 consisting of a single ring element, e.g., the ring element 110, is also conceivable. In this case, the ring element 110 is rotated by a suitable activation tool relative only to the driving gear 23, so that the deformation bevels 126 move the axial shoulders 17 radially inward or, upon rotation in the opposite sense, radially outward for the purpose of release. Before assembly of the driving gear 23 and the accommodating fixture 25, the driving gear 23 would have to be held in place, for example.

Then the ring element 110 would be rotated until the areas 130 were over the individual support surfaces 99, and no unwanted backward rotation of the ring element 110 could take place. After the driving gear 23 is moved axially toward the accommodating fixture 25, and the teeth of the tooth system 19 engage between the teeth of the tooth system 51, the cover 31 of the torque converter, i.e., the accommodating fixture 25, is held in place, and the ring element 110 is turned in the opposite direction, so that the axial shoulders 17 are released. Then, to detach the coupling engagement, the accommodating fixture 25 is held in place, and the ring element 110 is again rotated to move the axial shoulders 17 radially inward.

It should again be pointed out that the embodiments of the assembly mechanism 70 shown in FIGS. 14 through 25 can also be used with differently constructed driving gears. In particular, the driving gear does not need to be embodied with spring tongues, as described above. In other words, an assembly mechanism 70 of this type can be used even with a driving gear such as that shown in FIG. 1.

Moreover, it should be noted that multiple teeth of the tooth system 19 can be provided on each spring tongue 116, so that the deformation bevels associated with the spring tongues 116 can radially move a group of teeth.

The invention is not limited by the embodiments described above which are presented as examples only but can be modified in various ways within the scope of protection defined by the appended patent claims.

I claim:

1. A coupling device comprising:
    a driving gear that is actable on a drive train;
    a centrifugal mass facing the drive train and in rotation-proof active connection with the driving gear; and
    an accommodating fixture provided on the centrifugal mass so as to face the driving gear, the accommodating fixture having a first tooth system, the driving gear having a radial portion with an axial shoulder embodied with a second tooth system on a side facing the accommodating fixture, the accommodating fixture being slid onto the driving gear so that at least one tooth of the second tooth system engages without radial play into a space between two teeth of the first tooth system whereby the teeth of at least one of the two tooth systems are under radial prestress relative to the other tooth system and thereby form a non-rotatable connection between the centrifugal mass and the drive train.

2. A coupling device as defined in claim 1, wherein each tooth of the second tooth system has tooth faces embodied with a wedge surface so that each of the teeth engages as a wedge into a corresponding space of the first tooth system.

3. A coupling device as defined in claim 2, wherein each tooth of the first tooth system has tooth faces with a wedge surface which is matched with respect to angle to the wedge surfaces of the teeth of the second tooth system.

4. A coupling device as defined in claim 1, and further comprising means for axially securing, relative to the circumference, the axial shoulder of the driving gear in a region of the engaged tooth systems so as to prevent axial movement between the driving gear and the accommodating fixture.

5. A coupling device as defined in claim 4, wherein the axial securing means includes a radially movable claw connected to the axial shoulder and having a free end with a radial holding member that engages into a radial depression in the accommodating fixture.

6. A coupling device as defined in claim 5, wherein the radial holding member of the claw is wedge-like and engages under radial prestress into the radial depression in the accommodating fixture.

7. A coupling device as defined in claim 6, wherein the radial depression is shaped to match the radial holding member of the claw.

8. A coupling device as defined in claim 1, and further comprising assembly means for establishing an engagement connection between the driving gear and the accommodating fixture, the assembly means being operative to draw away the at least one tooth of the driving gear against the radial prestress from the accommodating fixture, action of the assembly means being terminable after establishment of the engagement of the engagement connection.

9. A coupling device as defined in claim 8, wherein the assembly means is configured to surround the axial shoulder at least for a duration of establishment of the engagement connection while an inwardly directed radial force is exerted on the at least one tooth of the driving gear.

10. A coupling device as defined in claim 9, wherein the assembly means includes a clamping clip having a band that surrounds the axial shoulder and, at a first end of the band, a screw housing that accommodates a clamping screw having a thread that engages into a threaded impression at a free second end of the band so as to produce, via the threaded connection with the threaded impression, a relative movement of the band relative to the screw housing for initiating a clamping procedure.

11. A coupling device as defined in claim 9, wherein the assembly means includes a pressure source, a pressure hose that surrounds the axial shoulder, and a pressure connection that connects the pressure hose to the pressure source so that when pressure is supplied from the pressure source to the pressure hose the hose diametrally expands its cross-section and clamps the axial shoulder.

12. A coupling device as defined in claim 11, wherein the assembly means further includes a protective sleeve arranged to cover the pressure hose.

13. A coupling device as defined in claim 9, wherein the assembly means includes a clamping ring arranged to be axially movable on a conical section of the axial shoulder.

14. A coupling device as defined in claim 9, wherein the assembly means includes a clamping loop with spreading ends which have a prestress relative to each other in a circumferential direction.

15. A coupling device as defined in claim 9, wherein the assembly means includes: a clamping loop having a holding end and a tension end; a tool having a piece that holds the holding end; and tensioning means, movable relative to the piece, for clamping the tension end.

16. A coupling device as defined in claim 8, wherein the axial shoulder has an axially free end with a support surface for the assembly means.

17. A coupling device as defined in claim 1, wherein the accommodating fixture has a support and an axial shoulder on which the first tooth system is accommodated.

18. A coupling device as defined in claim 17, wherein the first tooth system of the accommodating fixture is embodied on a radial outer side of the axial shoulder and is annularly surrounded by the axial shoulder of the driving gear with the driving-gear tooth system.

19. A coupling device as defined in claim 17, wherein the support is an axially elastic flange.

20. A coupling device as defined in claim 19, wherein the flange of the accommodating fixture has an elastic spring coil.

21. A coupling device as defined in claim 17, and further comprising assembly means for establishing an engagement connection between the driving gear and the accommodating fixture, the assembly means being operative to draw away the at least one tooth of the driving gear against the radial prestress from the accommodating fixture, action of the assembly means being terminateable after establishment of the engagement connection, the axial shoulder having a support surface for the assembly means.

22. A coupling device as defined in claim 21, where the support surface is embodied on a free end of the axial shoulder.

23. An assembly mechanism for a coupling device having: a driving gear that acts on a drive train; a centrifugal mass facing the drive train and in rotation-proof active connection with the driving gear; and an accommodating fixture provided on the centrifugal mass so as to face the driving gear, the accommodating fixture having a first tooth system, the driving gear having an axial shoulder embodied with a second tooth system on a side facing the accommodating fixture so that at least one tooth of the second tooth system engages into a space between two teeth of the first tooth system whereby the teeth of at least one of the two tooth systems are under radial prestress relative to the other tooth system, whereby a toothed engagement between the tooth systems can be selectively established and detached by the assembly mechanism, and whereby the tooth systems engage at least radially with each other, and the radially inner tooth system is prestressed radially outward against the radially outer tooth system, and whereby the component that has the radially inner tooth system is radially elastically deformable at least in the area of its tooth system, the assembly mechanism comprising:

at least one ring element that is rotatably attachable to the component that has the radially inner tooth system, the ring element having a deformation formation, via which, upon rotation of the ring element around a rotational axis, the radial position of the component that has the radially inner tooth system can be changed in an area of the radially inner tooth system.

24. An assembly mechanism as defined in claim 23, wherein the deformation formation has a circumferentially extending deformation bevel which is directed radially inward and has a varying distance from the rotational axis in the circumferential direction.

25. An assembly mechanism as defined in claim 24, wherein the formation is configured so that at least one of an area of minimum distance of the deformation bevel from the rotational axis and an area of maximum distance of the deformation bevel from the rotational axis is followed in the circumferential direction by an area with an approximately constant distance from the rotational axis.

26. An assembly mechanism as defined in claim 23, wherein the assembly mechanism comprises two ring elements.

27. An assembly mechanism as defined in claim 26, wherein the deformation formations each have a circumferentially extending deformation bevel which is directed radially inward and has a varying distance from the rotational axis in the circumferential direction, the deformation bevels of the two ring elements running opposite to each other, whereby a pair consisting of one deformation bevel from each ring element is associated with at least one tooth of the radially inner tooth system.

28. An assembly mechanism as defined in claim 26, wherein the two ring elements are rotatable around the rotational axis in opposite directions so as to selectively establish and detach the coupling engagement between the tooth systems.

29. An assembly mechanism as defined in claim 26, wherein the two ring elements are prestressed relative to each other for rotation in the circumferential direction into a relative rotational position in which the coupling engagement is established between the tooth system.

30. An assembly mechanism as defined in claim 23, wherein the ring element has at least one tool grasping formation by which at tool can grasp the ring element for rotating around the rotational axis.

31. An assembly mechanism as defined in claim 23, wherein the ring element is held in rotatable fashion on the component that has the radially inner tooth system.

32. A coupling device for establishing a rotary connection between two component groups rotatable around a rotational axis, the coupling device comprising: a first component with a first tooth system that is associated with one of the component groups; and a second component with a second tooth system that is associated with the other component group, the two tooth systems engaging radially into each other and being prestressed radially into engagement, a radially inner of the tooth systems being prestressed radially outward against a radially outer of the tooth systems, and further comprising an assembly mechanism having: a driving gear that acts on a drive train; a centrifugal mass facing the drive train and in rotation-proof active connection with the driving gear, and an accommodating fixture provided on the centrifugal mass so as to face the driving gear, the accommodating fixture having a first tooth system, the driving gear having an axial shoulder embodied with a second tooth system on a side facing the accommodating fixture so that at least one tooth of the second tooth system engages into a space between two teeth of the first tooth system whereby the teeth of at least one of the two tooth systems are under radial prestress relative to the other tooth system, whereby a toothed engagement between the tooth systems can be selectively established and detached by the assembly mechanism, and whereby the tooth systems engage at least radially with each other, and the radially inner tooth system is prestressed radially outward against the radially outer tooth system, and whereby the component that has the radially inner tooth system is radially elastically deformable at least in the area of its tooth system, the assembly mechanism comprising:

at least one ring element that is rotatably attachable to the component that has the radially inner tooth system, the ring element having a deformation formation, via which, upon rotation of the ring element around a rotational axis, the radial position of the compound that has the radially inner tooth system can be changed in an area of the radially inner tooth system.

33. A coupling device comprising:

a driving gear that is actable on a drive train;

a centrifugal mass facing the drive train and in rotation-proof active connection with the driving gear; and an accommodating fixture provided on the centrifugal mass so as to face the driving gear, the accommodating fixture having a first tooth system, the driving gear having an axial shoulder embodied with a second tooth system on a side facing the accommodating fixture so that at least one tooth of the second tooth system engages into a space between two teeth of the first tooth system whereby the teeth of at least one of the two tooth systems are under radial prestress relative to the other tooth system, the accommodating fixture being a ring arranged to surround the axial shoulder of the driving gear.

34. A coupling device as defined in claim 33, wherein the first tooth system of the accommodating fixture is an internal tooth system into which the second tooth system of the driving gear engages with a prestress directed radially outward.

35. A coupling device comprising:

a driving gear that is actable on a drive train;

a centrifugal mass facing the drive train and in rotation-proof active connection with the driving gear; and an accommodating fixture provided on the centrifugal mass so as to face the driving gear, the accommodating fixture having a first tooth system, the driving gear having an axial shoulder embodied with a second tooth system on a side facing the accommodating fixture so that at least one tooth of the second tooth system engages into a space between two teeth of the first tooth system whereby the teeth of at least one of the two tooth systems are under radial prestress relative to the other tooth system, the driving gear having an axially elastic flange at least along one portion of its radial extension, the flange having a bend at least in a circumferential area that forms the axial shoulder.

36. A coupling device as defined in claim 35, wherein the flange has at least one elastic spring coil radially inside the bend.

37. A coupling device as defined in claim 35, and further comprising damping means mounted to the elastic spring coil on the flange.

38. A coupling device as defined in claim 37, wherein the damping means includes at least one elastomer member which at least partially fills an empty space formed by the spring coil.

39. A coupling device comprising:

a driving gear that is actable on a drive train;

a centrifugal mass facing the drive train and in rotation-proof active connection with the driving gear;

an accommodating fixture provided on the centrifugal mass so as to face the driving gear, the accommodating fixture having a first tooth system, the driving gear having an axial shoulder embodied with a second tooth system on a side facing the accommodating fixture so that at least one tooth of the second tooth system engages into a space between two teeth of the first tooth system whereby the teeth of at least one of the two tooth systems are under radial prestress relative to the other tooth system;

assembly means for establishing an engagement connection between the driving gear and the accommodating fixture, the assembly means being operative to draw away the at least one tooth of the driving gear against the radial prestress from the accommodating fixture, action of the assembly means being terminatable after establishment of the engagement connection, the axial shoulder having an axially free end with a support surface for the assembly means; and means for axially securing, relative to the circumference, the axial shoulder of the driving gear, the axial securing means being attached to the free end of the axial shoulder.

40. A coupling device as defined in claim 33, wherein the axial securing means is configured and arranged to be effective in the axial extension area of the tooth systems and engages into the first tooth system provided on the accommodating fixture.

* * * * *